(12) United States Patent
Tenhunen et al.

(10) Patent No.: US 7,738,891 B2
(45) Date of Patent: Jun. 15, 2010

(54) SYSTEM, APPARATUS, AND METHOD FOR DYNAMICALLY CONFIGURING APPLICATION ACCESS POINT SETTINGS

(75) Inventors: Jouko U Tenhunen, Helsinki (FI); Jyrki Pe Berg, Lohja (FI); Atte Lahtiranta, Espoo (FI); Miikka Sainio, Kerava (FI); Mika Mannermaa, Espoo (FI)

(73) Assignee: Nokia Corporation, Espoo (FI)

( * ) Notice: Subject to any disclaimer, the term of this patent is extended or adjusted under 35 U.S.C. 154(b) by 866 days.

(21) Appl. No.: 11/478,351

(22) Filed: Jun. 29, 2006

(65) Prior Publication Data
US 2007/0167182 A1 Jul. 19, 2007

Related U.S. Application Data

(63) Continuation-in-part of application No. 11/293,885, filed on Dec. 2, 2005.

(51) Int. Cl.
*H04Q 7/20* (2006.01)

(52) U.S. Cl. .................. 455/512; 455/500; 455/517; 455/426.1; 455/432.1; 455/432.3; 370/310; 370/328; 370/329; 370/338; 370/349

(58) Field of Classification Search ............... 455/512, 455/500, 517, 426.1, 426.2, 422.1, 403, 432.1, 455/432.2, 433, 445, 466, 412.1, 412.2, 550.1, 455/552.1, 553.1, 414.1–414.4; 370/310, 370/328, 329, 338, 341, 349
See application file for complete search history.

(56) References Cited

U.S. PATENT DOCUMENTS 5,852,722 A 12/1998 Hamilton
5,875,186 A * 2/1999 Belanger et al. ............ 370/331
6,029,196 A 2/2000 Lenz
7,290,029 B2 10/2007 Tang et al.
7,457,878 B1 11/2008 Mathiske et al.
7,512,651 B2 * 3/2009 Offermann .................. 709/203
7,519,681 B2 4/2009 Edwards et al.
2002/0029252 A1 3/2002 Segan et al.
2003/0028427 A1 2/2003 Dutta et al.

(Continued)

FOREIGN PATENT DOCUMENTS

EP 1531645 5/2005

(Continued)

OTHER PUBLICATIONS

Yegin et al., "Supporting Optimized Handover for IP Mobility—Requirements for Underlying Systems", Internet Draft, Jun. 2002.

(Continued)

*Primary Examiner*—Keith T Ferguson
(74) *Attorney, Agent, or Firm*—Hollingsworth & Funk, LLC

(57) ABSTRACT

Systems, apparatuses, computer program products, and methods for dynamically customizing and/or configuring applications on devices. Current access point information associated with the terminal is transmitted from the terminal. In response to providing this current access point information, the terminal receives updated access point information via the network. The terminal is configured to enable data communication by way of an access point identifiable from the updated access point information, rather than from any prior access points.

33 Claims, 10 Drawing Sheets

U.S. PATENT DOCUMENTS

| | | | |
|---|---|---|---|
| 2003/0078053 A1* | 4/2003 | Abtin et al. | 455/456 |
| 2005/0021935 A1 | 1/2005 | Schillings | |
| 2005/0210525 A1 | 9/2005 | Carle et al. | |
| 2005/0259883 A1 | 11/2005 | Lunetta et al. | |
| 2005/0275566 A1 | 12/2005 | Lahtiranta et al. | |
| 2006/0015520 A1 | 1/2006 | Lahtiranta | |
| 2006/0092890 A1* | 5/2006 | Gupta et al. | 370/338 |
| 2006/0215623 A1* | 9/2006 | Lin et al. | 370/338 |
| 2008/0003991 A1 | 1/2008 | Sievers et al. | |

FOREIGN PATENT DOCUMENTS

| | | |
|---|---|---|
| WO | WO 98/26548 | 6/1998 |
| WO | WO 2005/062652 | 7/2005 |

OTHER PUBLICATIONS

Zafeiris et al., "An Agent-based Architecture for Handover Initiation and Decision in 4G Networks", Proceedings of the Sixth IEEE International Symposium on a World of Wireless Mobile and Multimedia Networks, @005.

QUALCOMM Press Release, "QUALCOMM Announces Availability of User Interface Development Support for BREW®", Jun. 7, 2004.

Nokia, "Preminet Solution", printed from Internet Apr. 1, 2006.

Nokia, "Preminet Client", printed from Internet Apr. 1, 2006.

Nokia, FAQ: The Preminet Client Solution, Feb. 13, 2006.

Office Action from USPTO for U.S. Appl. No. 11/293,885 dated Jan. 12, 2009.

Office Action from USPTO for U.S. Appl. No. 11/293,885 dated Jun. 8, 2009.

* cited by examiner

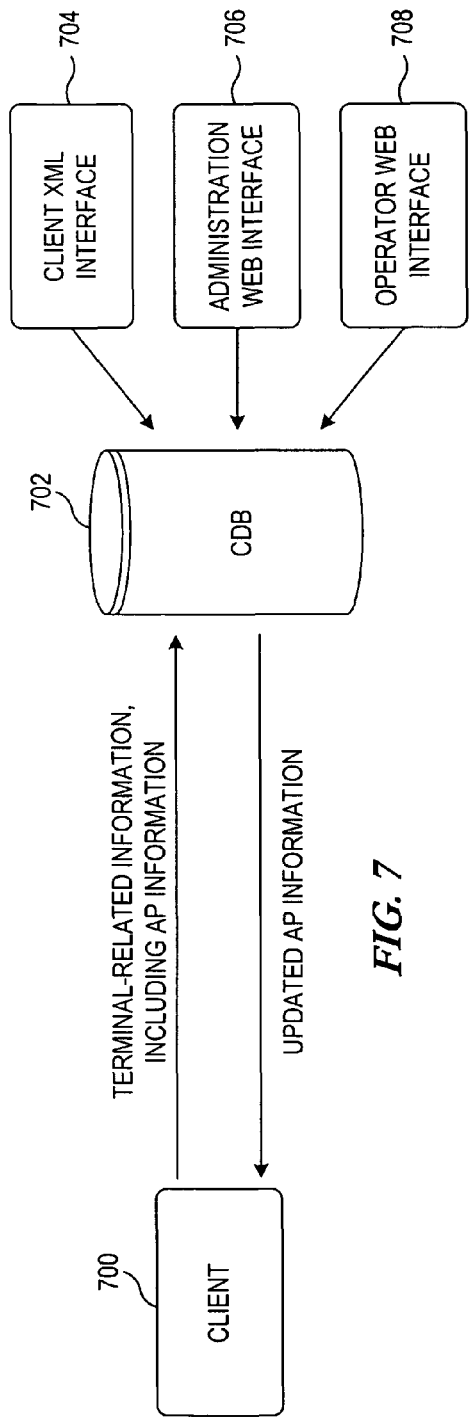
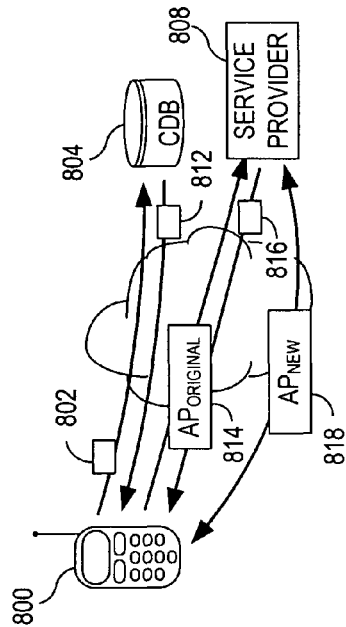
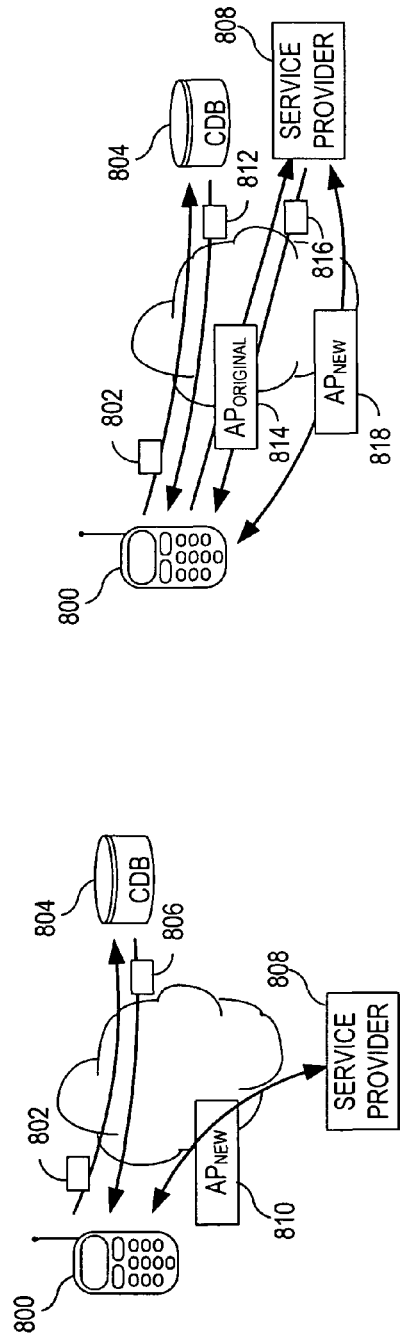
FIG. 7
FIG. 8A
FIG. 8B

SYSTEM, APPARATUS, AND METHOD FOR DYNAMICALLY CONFIGURING APPLICATION ACCESS POINT SETTINGS

RELATED APPLICATIONS

This is a continuation-in-part of U.S. patent application Ser. No. 11/293,885, entitled "System, Apparatus, And Method For Dynamically Customizing And Configuring Applications," filed on Dec. 2, 2005, now U.S. Publication No. 2007/0130156, the content of which is incorporated herein by reference in its entirety.

FIELD OF THE INVENTION

This invention relates in general to device configuration, and more particularly to a systems, apparatuses, computer program products, and methods for dynamically customizing and/or configuring device connectivity.

BACKGROUND OF THE INVENTION

In recent times, functional capabilities of computers and communication devices continue to migrate towards one another. Computers are used for electronic mail, file transfer, and even telephone communications. Communication devices such as mobile phones originally provided primarily telephone services, but now continue to gain processing power and capabilities traditionally limited to computers. For example, mobile devices now typically include capabilities to send and receive electronic mail (e.g., e-mail, Short Message Service, Multimedia Messaging Service, etc.), as well as data communication capabilities. These advances in mobile devices and the associated mobile network infrastructures allows mobile devices to gain access to content and other data that was once only within the ambit of larger, wired computers.

Mobile operators and service providers have taken advantage of these new capabilities of mobile terminals. A variety of mobile content is now available to mobile terminal users, including images, ring tones, music files, games, calendars, contact management, device utilities, and so forth. While these advances benefit operators, service providers, users and others involved in the content distribution chain, some complexities arise as a result of the various developers, service providers, operators and other vendors who provide services that ultimately enable this content to be provided to end-users. For example, the content/service providers need to be able to make their content/services available to the consuming public. Operators often have different service/content offerings, and need to have a way to identify and select the desired service/content that they will offer.

Another complexity involves the manner of delivery of this content and/or services in a manner desired by the content providers and operators, or in a manner that provides for better access to the service. For example, the advent of Mobile Virtual Network Operators (MVNOs) has created some complexities. Detecting MVNO operators' subscribers from other MVNO operators operating in the same network or the network operator's subscribers is not possible with Mobile Country Code (MCC) and Mobile Network Code (MNC) mapping.

Further, when terminal applications connect to multiple servers, the best access point might not be the same for all servers. Some servers may require connecting through a specific access point for various reasons, such as to obtain needed authentication information from a WAP-proxy for billing, or the access point has limitations as to how large the content can be that is transferred through it, or due to specific arrangements made with an operator. The default access point settings used by an application might not be optimal or otherwise desirable.

Accordingly, there is a need for solutions to the aforementioned problems. The present invention fulfills these and other needs, and offers a variety of advantages over prior art solutions.

SUMMARY OF THE INVENTION

To overcome limitations in the prior art described above, and to overcome other limitations that will become apparent upon reading and understanding the present specification, the present invention discloses systems, apparatuses, computer program products, and methods for dynamically customizing and/or configuring applications on devices.

In accordance with one embodiment of the invention, a method is provided for configuring access points in a terminal. At least the current access point information associated with the terminal is transmitted from the terminal. In response to providing this current access point information, the terminal receives updated access point information via the network. The terminal is then configured to enable data communication via an access point identifiable from the updated access point information, rather than from any prior access points.

According to more particular embodiments of such a method, receiving the updated access point information involves receiving the updated access point information from a configuration server system. In another embodiment, the terminal receives the updated access point information from a network element associated with providing a service targeted by an application on the terminal, e.g., a content server(s). One embodiment involves transmitting the current access point information from the terminal by initiating the transmission of the current access point information via an application on the terminal, and where configuring the terminal involves configuring the terminal to enable data communication with that application via an access point provided via the updated access point information.

Another embodiment of the method entails retrieving, by the terminal, an address of a configuration server upon activation of an application at the terminal. In such an embodiment the access point information is transmitted to the configuration server addressed by the address. In one embodiment, the address is a Uniform Resource Identifier (URI) that corresponds to the configuration server.

Embodiments of the aforementioned method involve overriding the current access point information at different times or in response to different events. For example, one embodiment involves permanently overriding the current access point information with the updated access point information. In another embodiment, the current access point information is overridden with the updated access point information until a subsequent configuration of the access point is performed. Another embodiment involves temporarily overriding the current access point information with the updated access point information, such as for a time duration, between certain dates/times, for a number of connections, etc.

In accordance with other particular embodiments of such a method, receiving updated access point information may involve receiving application-specific access point information that is at least partly dependent on a particular application operating on the terminal. In another embodiment, receiving updated access point information may involve receiving catalog-specific access point information identifying an access point for communicating with a catalog server system. For example, an address of the catalog server may be received, and the terminal may be configured to communicate with the catalog server system that is identified by that address, and to communicate with the catalog server system by way of the access point identified from the catalog-specific access point setting.

In other particular embodiments of such a method, the updated access point information includes multiple access point settings available for use as the access point, where the updated access point information includes a relative prioritization of the plurality of access point settings. In one embodiment, configuring the terminal involves configuring the terminal to enable data communications using the highest relative priority access point setting.

In still other particular embodiments of the method, configuring the terminal involves automatically configuring the terminal to enable data communication via an access point having a network address provided via the updated access point information. In another embodiment, configuring the terminal involves automatically configuring the terminal to enable data communication via an access point having a network address that is derived or located using the updated access point information. In still another embodiment, configuring the terminal to enable data communication via the access point involves replacing a current access point address with an updated access point address determined from the updated access point information.

One embodiment of the method involves invoking an application on the terminal, and transmitting the current access point information from the terminal in response to invoking the application on the terminal. Among other possibilities, invoking the application may involve a first activation of the application on the terminal, or invoking the application in response to a user input and/or triggering event.

The updated access point information is configured on the terminal as the default access point setting for all applications in one embodiment of the invention. Another embodiment involves obtaining an application-specific access point setting after the default access point has been configured on the terminal, and overriding the default access point setting using the application-specific access point setting.

The method provides for various non-exclusive options for the terminal upon receipt of the updated access point information. For example, one embodiment involves disregarding the updated access point information after receipt at the terminal and utilizing the current access point information. In another embodiment, a prompt is provided for user confirmation of a replacement of at least some of the current access point information with the updated access point information. Another embodiment involves storing the updated access point information for subsequent use on the terminal. Still another embodiment involves storing the current access point information, and reverting back to the current access point information from the updated access point information.

Another embodiment involves transmitting at least the current access point information from the terminal by way of a request from a client in the terminal. In another embodiment, the current access point information includes a current, active access point address(es). In yet another embodiment, the current access point information includes a set of one or more available access point settings.

In accordance with another embodiment of the invention, a terminal is provided that includes a storage (i.e., any type of media or circuitry capable of storing data) to store terminal-related information including an identification of at least one current access point by which the terminal can access a network. Also associated with the terminal is a transmitter, and a processing system coupled to the storage and configured to cause the transmitter to direct at least some of the terminal-related information to a network element. A receiver is configured to receive identification of at least one updated access point from the network element. The processing system is configured to replace at least one of the current access points with the at least one updated access point.

In a more particular embodiment of such a terminal, the processing system is configured to cause one or both of the transmitter and receiver to communicate data with the network element by way of the at least one updated access point. In yet another embodiment, the storage also stores an address of the network element, and the processing system is further configured to retrieve the address of the network element, and to cause the transmitter to direct the at least some terminal-related information to the network element addressed by the address. In one embodiment, the processing system is configured to cause the transmitter to direct the at least some terminal-related information to the network element in response to activation of an application operable on the terminal.

In another embodiment, the terminal(s) is associated with a system that includes the network element, where the network element is configured to ascertain the at least one updated access point from a database based on at least some of the terminal-related information. In another embodiment, the network element is represented by a configuration server system, and where the database includes database records of a plurality of the terminals. In still another embodiment the network element is a content server that is configured to provide the updated access point and data requested by the terminal.

According to another embodiment of the invention, a server operable on a network is provided. The server includes a receiver configured to receive terminal-related information from a plurality of terminals, where the terminal-related information includes at least current access point information by which terminals gain access to the network. An access point information identification module is provided that is executable by a processing arrangement and configured to obtain updated access point information for the terminals based on at least some of the terminal-related information. A transmitter is configured to transmit the updated access point information to the respective terminals for use by the respective terminals in updating the current access point information with the updated access point information.

In more particular embodiments of such a server, the server includes a database of the updated access point information available for the plurality of terminals, where the access point information identification module is further configured to identify within the database the updated access point information for a particular terminal based on the terminal-related information provided by that particular terminal. In another embodiment, a plurality of the servers are provided and are distributed to multiple server locations, where at least some of the updated access point information is replicated in databases associated with each of the multiple server locations.

According to another embodiment of the invention, a method is provided for facilitating configuration of access points on terminals. The method includes receiving terminal-related information from a terminal, where the terminal-related information includes current access point information for the terminal. Updated access point information for the terminal is obtained using at least some of the terminal-related information, where the updated access point information includes at least one updated access point by which the terminal can gain access to a network. The updated access point information is transmitted to the terminal, thereby facilitating replacement of a current access point with the at least one updated access point at the terminal.

According to another embodiment of the invention, a system for configuring access points on terminals is provided that includes a configuration server system and a plurality of terminals. Each of the plurality of terminals includes a storage to store terminal-related information including an identification of at least one current access point by which the terminal can access a network. Also associated with the terminal is a transmitter, and a processing system coupled to the storage and configured to cause the transmitter to direct at least some of the terminal-related information to a network element. A receiver is configured to receive identification of at least one updated access point from the network element. The processing system is configured to replace at least one of the current access points with the at least one updated access point. The configuration server system includes a receiver configured to receive the terminal-related information from the terminals, and an access point information identification module executable by a processing arrangement and configured to obtain the identification of the updated access point for the terminals based on at least some of the terminal-related information. The configuration server system also includes a transmitter configured to transmit the updated access point information to the respective terminals for use by the respective terminals in replacing the at least one current access point with the at least one updated access point.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described particular representative examples of systems, apparatuses, computer program products, and/or methods in accordance with the invention.

BRIEF DESCRIPTION OF THE DRAWINGS

The invention is described in connection with the representative embodiments illustrated in the following diagrams.

FIG. 7 is a block diagram illustrating a client-initiated retrieval of access point information suitable for use by the client;

FIGS. 8A and 8B are block diagrams illustrating representative embodiments of systems for reconfiguring access point information to enable data communication with a targeted service provider;

DETAILED DESCRIPTION OF THE INVENTION

Figure 1:
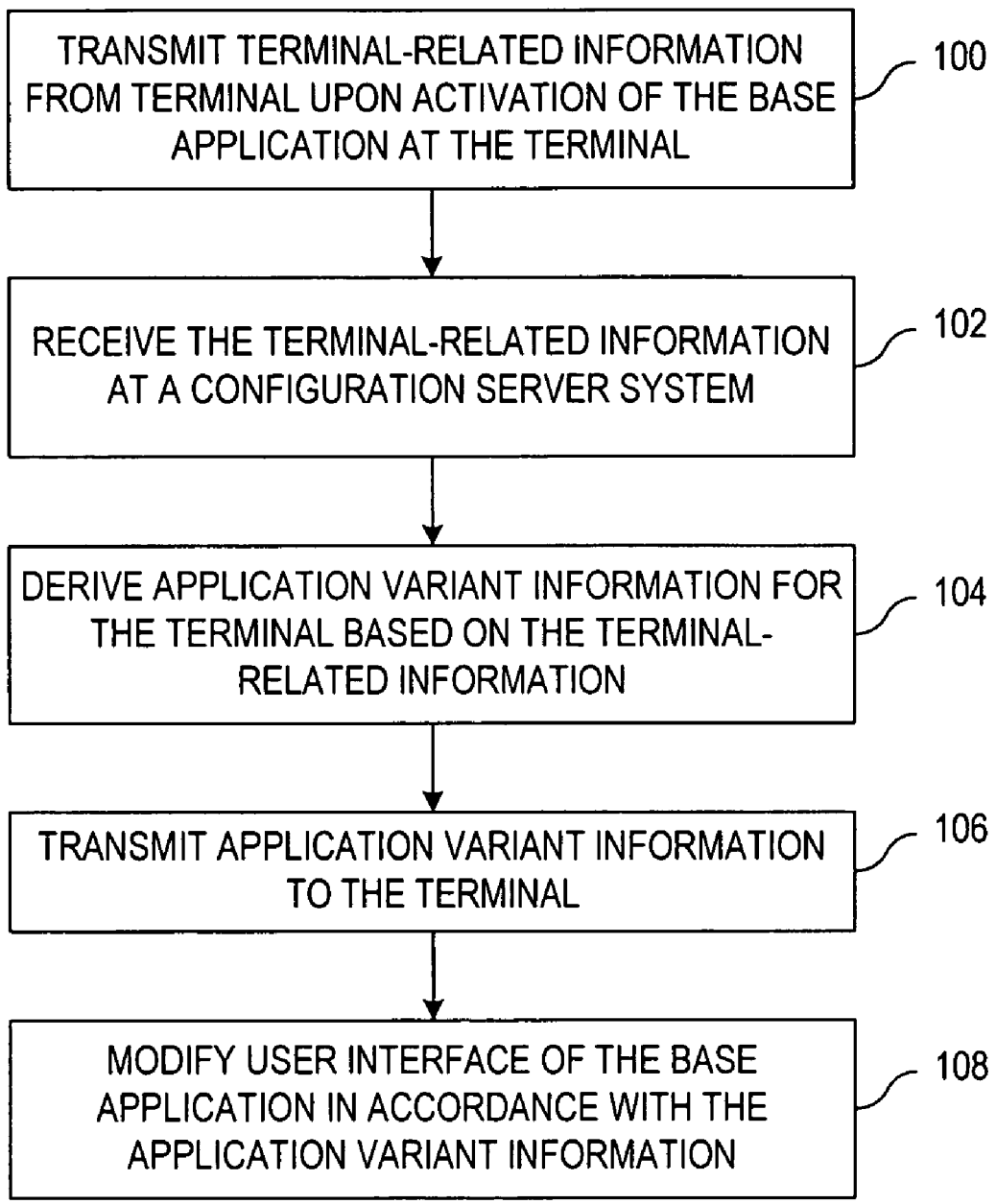
FIG. 1 is a flow diagram illustrating a representative method for modifying a base application resident on a terminal in accordance with principles of the invention.

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides systems, apparatuses and methods for dynamically configuring access point settings for an application(s) operable on a terminal. For example, a method that may be implemented in accordance with the principles of the invention involves a manner of dynamically associating particular access point settings with a terminal, and/or with a particular application(s) on the terminal. Terminals may include, for example, mobile phones, Personal Digital Assistants (PDAs), laptop/notebook computers, workstations, and/or other devices capable of executing applications and communicating information to and from a network(s). These devices may communicate with a network via wireless and/or wired mechanisms. The terminal application(s) may be, for example, an application(s) that is installed on or otherwise delivered to the terminal at the time of manufacture or other time prior to retail delivery, or may be delivered to or otherwise installed on the terminal at a retail store or after purchase of the terminal by a user. In general, any device that executes applications that can be made to reside on the terminal, and can communicate with other devices via a network or otherwise, can be used in connection with the present invention.

Representative manners for dynamically configuring access point settings for terminal applications include embodiments where at least access point (AP) information, and optionally terminal-related information, is transmitted from the terminal. For example, at least the current access point information may be transmitted from the terminal. In response, the terminal may receive updated access point information from the network, such as from a configuration server system. In one embodiment, the terminal is automatically configured to enable terminal data communications via an access point identifiable from the updated access point information. Thus, the access point information may directly identify an address of the appropriate access point(s), or may otherwise provide information that allows the terminal to acquire the access point address using the access point information.

In a general sense, the present invention provides for a modification on a terminal by transmitting terminal-related information (including access point information), receiving appropriate variant information that is derived from the transmitted terminal-related information, and modifying a configuration of the mobile terminal based on the received variant information. A system which also provides for terminal modifications in an analogous manner is described in co-pending U.S. Publication No. 2007/0130156. The present invention is a continuation-in-part (CIP) of the aforementioned U.S. Publication No. 2007/0130156, the content of which is incorporated herein by reference in its entirety. A first aspect of the invention is now described, which corresponds to the subject matter of U.S. Publication No. 2007/0130156.

Aspects of the invention include systems, apparatuses and methods for applying one or more application variants to a base application(s) upon initial activation or other initial use of the base application. For example, a method that may be implemented in accordance with the principles of the invention involves a manner for modifying a base application(s) resident on a terminal. One embodiment of a method for modifying a base application(s) resident on the terminal involves transmitting terminal-related information from the terminal upon activation (including any predefined initial use) of the application at the terminal. For example, a common "base" application or client may be delivered as a resident application/client in a terminal or group of terminals. When a user, retailer, testing personnel or the like initially activates or otherwise uses the base application for the first time, terminal-related information is transmitted from the terminal. When referring to "first time," this means the first time the application is activated/used under normal circumstances, such as the first time a user invokes the particular application. In other words, there may be prior design, testing, experimental, etc uses where the feature is disabled, prior to the first actual activation/use of the application under normal circumstances.

As is described more fully below, such terminal-related information may include any number of different attributes, including any one or more of characteristics of the specific terminal, identifications of the operator/service provider associated with the terminal, terminal firmware, client identifiers, phone language, current access point information, etc. This information is received at a network element(s), such as a server system, for processing. The server may receive the information via one or more networks, including Global Area Networks (GANs) such as the Internet or other wide-area networks, mobile networks such as Global System for Mobile Communications (GSM), General Packet Radio System (GPRS), CDMA, short-range or "proximity" networks such as via local Wireless Access Points (WAPs) in the case of Bluetooth and/or other networks, etc. What is relevant is that the terminal can provide its terminal-related information via the relevant network(s) to reach the specific or distributed server system of the invention. This stand-alone or distributed server system is hereinafter interchangeably referred to as configuration server system, or configuration database (CDB) which represents the database of information associated with the configuration server system. The configuration server system derives application variant information for the terminal associated with the received terminal-related information, and uses the terminal-related information as the basis for deriving the application variant information. Accordingly, the configuration server system may derive or otherwise create different application variant information for different terminals having different terminal-related information.

When this application variant information is derived or otherwise obtained via the configuration server system, it is transmitted back to the terminal where it is used to modify the application (that was undergoing its first activation/use) in accordance with the application variant information. For example, in one embodiment, the application variant information includes user interface (UI) information including any one or more of display backgrounds, icons, brand information, colors, audio, etc. In this manner, the same, common base application may be provided on a number of terminals being placed on the market, and operator-specific, service provider-specific, vendor-specific or other analogous information may be used to modify the application presentation accordingly. In a more particular embodiment, the application variant information provides branding and/or skinning information to modify the first-time-used application at the terminal.

As will be described more fully below, the variant information may also include access point information to allow the terminal to update its connection settings to something that is more appropriate for the terminal's location, the server's location, the application type, and/or other factors that may affect the particular access point and associated network connectivity.

Thus, embodiments of one aspect of the invention provide mechanisms and methods for automating and enabling updating, configuring, branding and/or other modifications to post-sales terminal applications based on any one or more attributes. The updating, configuring, branding, etc. can involve partial or entire modifications to the application. The invention provides a number of advantages and benefits, such as shortening the time in which it takes before shipping a new terminal with bundled content. Currently, content must be ready months prior to shipping, which includes specific content for every application variant that may be used for any of the terminals. This solution also provides consistency and reduces latency issues. For example, where an operator-specific variant of an application is installed on a mobile phone during manufacture, it may be months before a user actually uses the application, and the UI or other modifications desired by the operator may already be out of date. In accordance with one embodiment of the invention, this ensures that the user will modify the application upon first use with the most recent configuration data available in the configuration server system. Further, because the configuration server system can be implemented as a globally-hosted database, such a distributed system provides redundancy with minimized latency to serve any client consistently, regardless of the terminal users' whereabouts. Another advantage is that the configuration server system can aggregate collections of media gathered from multiple independent sources, where these collections of media (and/or updates to such collections) can be provided to the users. The aforementioned advantages are merely representative examples of advantages provided by this aspect of the present invention, and does not represent an exhaustive list of all of the advantages.

FIG. 1 is a flow diagram of one embodiment involving a method for modifying a base application resident on a terminal. This method includes transmitting 100 terminal-related information from the terminal upon activation of the base application at the terminal. The base application can represent any application for which application variance is to be applied in accordance with the principles of the present invention. In one embodiment the initial activation of the base application refers to a user's first access of the application, such as when the user of the terminal first invokes the application for use. In one embodiment, the transmission 100 of the terminal-related information is effected by way of one or more networks. For example, in the context of mobile terminals, the mobile terminal may transmit the information via a wireless network such as a cellular network (GSM/GPRS, CDMA, etc.). The mobile terminal may also transmit the information via a wireless local area network (WLAN), Bluetooth network, or other proximity network. The terminal may also be coupled to a network via a wired connection, such as an ethernet connection. Any manner of connecting to a network to ultimately access the configuration server system is suitable.

The terminal-related information transmitted from the terminal is received 102 at the configuration server system. The configuration server system derives 104 application variant information for the terminal based on the terminal-related information provided by the terminal. For example, the terminal-related information may include information relating to the operator/service provider, terminal characteristics and the like, and from this information the appropriate application variant information for that terminal can be accessed from the CDB. The application variant information is then transmitted 106 back to the terminal, where it can be used by the terminal to modify the base application accordingly. Such modification may include modifying the user interface (UI) of the base application in a manner identified by the application variant information, as described more fully in connection with ensuing exemplary embodiments.

Figure 2:
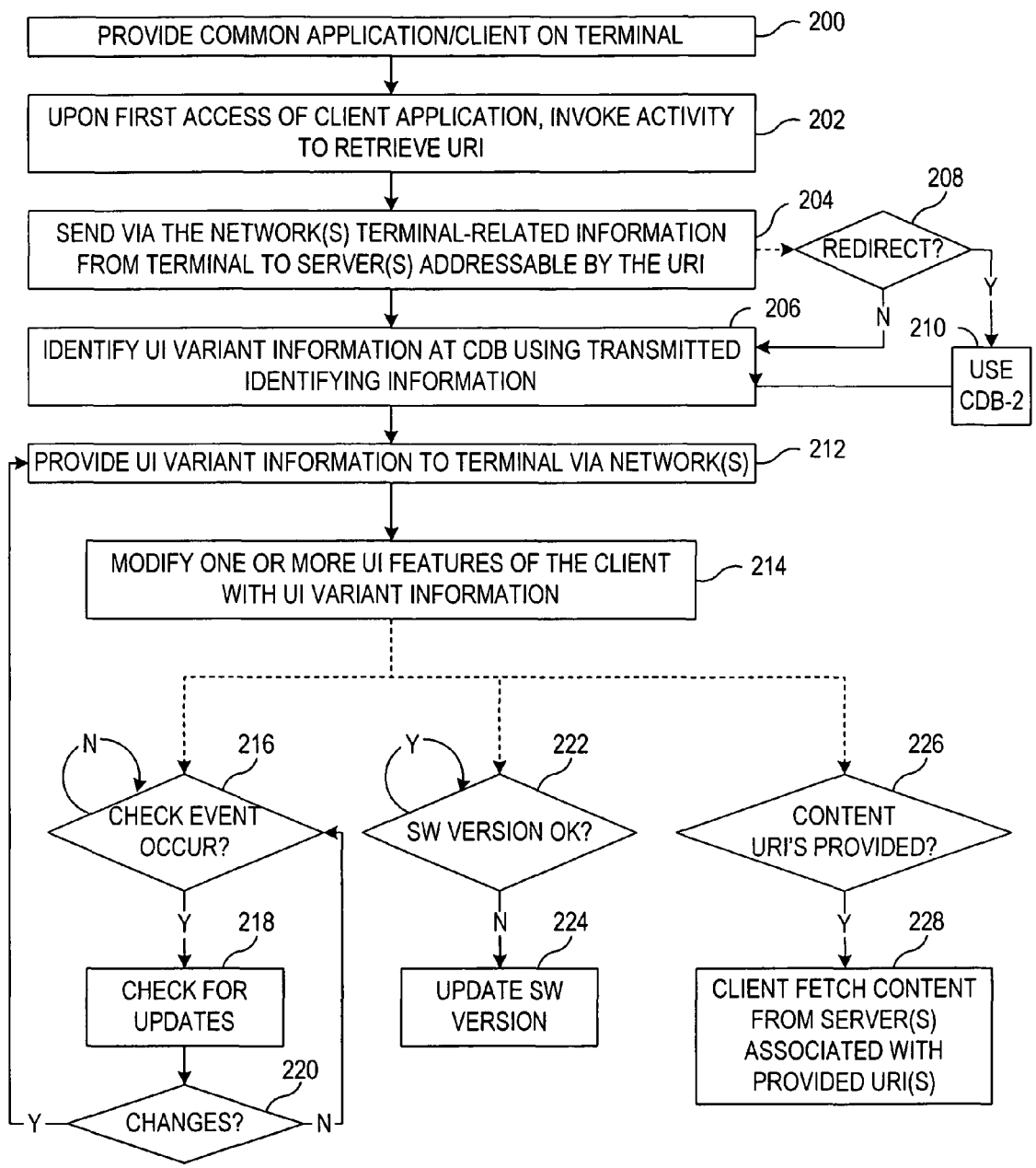
FIG. 2 is a flow diagram of other representative methods for modifying a terminal-resident client application based on terminal-related information.

FIG. 2 is a flow diagram of one embodiment whereby a mobile terminal is able to modify the user interface (UI) of a resident application in accordance with this aspect of the invention. As will be shown in the embodiment of FIG. 2, this embodiment delivers a base or "vanilla" client within a mobile (or other) terminal. When the client is opened for the first time, it sends the necessary information to a global configuration server (e.g., configuration server system) which is equipped with a configuration database (e.g., CDB). The package of information retrieved from the CDB (using the information provided by the client) is provided to the terminal to skin or otherwise modify the UI of the terminal. The CDB may also check other information, such as whether the software version of the accessing client is up to date, and provide a new version for installation on-the-fly. Furthermore, in other particular embodiments described in ensuing figures, the CDB may return a list of different URIs, such as different catalogs' URIs, from which the client can fetch the actual content that is for sale and/or distribution.

Referring now to FIG. 2, the illustrated embodiment involves a method where a common or "base" application is provided 200 to the application/client on the terminal. For example, when a mobile terminal is being manufactured, various applications may be installed on the terminal. According to the present invention, such an application can be the same base application, which can then be updated with the appropriate client variants as described below. More particularly, upon first access of the client application, an activity to retrieve a stored Uniform Resource Identifier (URI) can be invoked 202. This URI, hereinafter referred to as the "Master URI," can be retrieved in any known manner. For example, the "activity" that is invoked at block 202 may involve invoking an application or API that manages retrieval of the URI. In another embodiment, the base application itself may include instructions to invoke a memory operation, such that the processor(s) operating on the terminal retrieve the Master URI from a known memory/storage location. In yet another embodiment, the Master URI is retrieved from a remote server. Any manner of retrieving the Master URI may be used in accordance with the invention.

Using the Master URI as an address of the configuration server system, the terminal sends 204 certain terminal-related information from the terminal to the configuration server system via a network(s). In one embodiment, this terminal-related information may include any information that can identify the appropriate UI variant information in the CDB of the configuration server system. For example, the terminal-related information may include information for determining the terminal type and characteristics. One such example is a User Agent Profile (UAProf) that describes the capabilities of a device and/or client. This or analogous profile information may include hardware and software characteristics of the terminal, such as the display size, resolution, audio capabilities, operating system, network characteristics (e.g., GSM/GPRS capable), browser or other access application particulars, etc. Terminal-related information may also/instead include information to determine the operator and/or service provider, such as a Mobile Country Code (MCC), Mobile Network Code (MNC), Service Provider Name (SPN), Short Message Service Center (SMSC) numbers, access point information, etc. This information may be derived from the Subscriber Identify Module (SIM) or otherwise. Other terminal-related information may include information to determine whether the terminal is a variant, such as firmware information. Terminal-related information may also/instead include terminal and/or client information, such as an International Mobile Equipment Identifier (IMEI), a Unique Identifier (UID) that uniquely identifies the client/application. Still further examples of terminal-related information include the terminal's current language selection, roaming indicator, etc.

As indicated above, the terminal-related information may include information to determine the operator, service provider, application developer, or other similar entity. For example, information such as the MCC, MNC, SPN, SMSC and the like may be used by the receiving configuration server to select the appropriate UI variant information from an aggregation of variant information owned and/or defined by different entities. As an example, if the MCC, MNC and/or SPN is provided as part of the terminal-related information, the configuration server may identify a particular operator who has defined certain application variant information to be provided when the MCC, MNC and/or SPN corresponds to that particular operator. Thus, this variant information may be provided by, controlled, maintained and/or otherwise defined by operators, service providers, application developers and the like, and in some embodiments the configuration server uses the relevant terminal-related information to identify which variant information (or subset of variant information) among the collection or totality of variant information associated with these entities is to be selected. An exemplary implementation of such an embodiment may include providing information such as the MCC, MNC, SPN or other codes that can be obtained at the terminal, such as via the terminal's SIM or other storage. Other information such as the Internet Protocol (IP) address from which the query is originating can be traced back to the operator's network and possibly to particular nodes such as a WAP gateway. This information may be gathered manually from operators and other data sources (e.g., MCC/MNC lists available to the public) and configured to the configuration database. The updating of the variant information of different entities at the configuration server may be performed manually at the configuration server, or otherwise such as allowing operators, service providers and others to update their variant information via an appropriate service. There are various manners in which different entities can obtain, update and/or manage their respective variant information made available by the configuration server, and the present invention is applicable to any such manners.

Different combinations of these and/or other terminal-related information may be used to identify 206 particular UI variant information at the CDB. For example, the information may be used to index or otherwise locate particular UI variant data stored at the CDB. In an alternative embodiment the CDB may optionally redirect the query to any other URI, as determined at decision block 208. If redirection is to be employed in this fashion, a different CDB (e.g., CDB-2) may be used 210. Using redirection in this manner provides the ability to create CDB subsystems, such as virtual CDBs within the global CDB system, that are dedicated to different purposes and can ensure flexible scalability.

In another embodiment, the Master URI can in some cases be configured not to point to the globally-hosted CDB, but rather to some other URI. For example, the URI could point to an operator/service provider's or other vendor's own CDB. In such an example, the operator, service provider or other entity could keep information separate from the globally-hosted CDB and provide this information themselves. This may be particularly practical where the terminal is manufactured as a variant for a particular operator, service provider, etc., where it may be known that the CDB data will be associated with that particular operator, service provider, etc.

When the particular UI variant information has been identified 206, it is provided 212 to the terminal. In an exemplary embodiment of the invention, this is provided via a network(s), although it is feasible to provide the information directly between the terminal and CDB by way of point-to-point transmission. When the terminal has received the information, it may modify 214 one or more UI features of the client with the UI variant information. For example, this UI variant information may be used to skin the client with operator-specific, service provider-specific or similar entity-specific branding, logos, icons, backgrounds, audio, tactile feedback (vibration) and/or other perceptible UI features or overlays.

This may be particularly useful in situations where mobile operators or other network service entities may want certain terminal applications to be branded to incorporate that entity's look and feel. One existing prior art manner of providing this information is to create several variants of the applications and install them in the factory, or in any event prior to the purchase or actual use of the terminal. The need for these multiple different variants cause significant burden to product development. The present invention allows as few as a single base application/client to be installed in the terminal, and the branding or other UI variations are effected when the client is first attempted to be used.

Various optional features may be implemented in connection with the UI variation system and methodology of the present invention. FIG. 2 illustrates some representative examples of such optional features. For example, periodic and/or situation-triggered events may invoke subsequent queries to the configuration server system to check for updated UI and/or other CDB data. This is depicted at decision block 216, where it is checked whether a particular event(s) occurred to trigger such a subsequent query(s). As a more particular example, the terminal client may have a pre-defined refresh counter that causes it to invoke a query to the CDB periodically (whereby the "event" may be the expiration of a time duration and/or reaching a pre-defined count). In another embodiment, if the client is already communicating with the configuration server system for any reason, the client can be configured to automatically make a request to refresh the UI information from that server. In yet another embodiment, the terminal user can be given the ability to force the client to contact the configuration server system (via the UI) to perform such a refresh. In any case, if such a request is made, the CDB checks for updates as shown at block 218. If there are changes to be made, this updated information can be provided 212 to the terminal, which in turn can again modify 214 the UI feature(s) of the client with the newly provided UI variant information.

Another optional feature includes having the CDB automatically check the software version of the accessing client, and provide a new version to be installed on-the-fly. For example, the software version may be checked 222, and if the software version is not up to date, the software version may be updated 224.

In another optional embodiment, one or more content URIs may be provided to the terminal, as determined at decision block 226. For example, the accessing client may be a client seeking information such as operator/service provider catalogs. It may be beneficial for an operator/service provider to be able to provide their logo, icon, look and feel, and/or other branding information as part of such a "catalog client." When the UI of the catalog client is modified in accordance with the invention, any content URIs requested by and provided to the catalog client, as determined at decision block 226, can be presented to the user in the manner desired by the operator/service provider. If such content URIs are provided, the catalog or analogous client can fetch 228 the desired content from a server(s) addressable by the provided URI(s). Because such a catalogs client itself can fetch independent catalogs from multiple sources (indicated with URIs), a set of catalog addresses can be returned with some common theme, and CDB solution providers can provide end-users collections of media. For example, media may be gathered from multiple independent sources, such as from service provider-A, service provider-B, etc. The implementation of such a catalog client is a particularly practical use of the present invention, as the UI associated with the client in the terminal that is to access content from a particular operator/service provider may be branded or otherwise modified to reflect the operator/service provider of the content or content selections. Further, as described more fully below, access point information may be provided by the CDB to the terminal, where the access point information is determined based on the particular client sending the request, such as the catalog client. For example, a particular catalog service provider may be optimally accessed via a particular access point, in which case this access point may be provided to the terminal to enable the terminal to connect by way of this received access point.

Still other optional features may be implemented, such as where a client is shared to another terminal (e.g., Bluetooth superdistribution), the stored Master URI in the terminal may enable the configuration of the shared client in the new host terminal, according to that particular end-user's and his/her service provider's profile. Further optional features may also be employed in connection with the present invention.

One aspect of the invention thus provides, as described in connection with FIGS. 1 and 2, a solution that may be used for, among other things, configuring and branding settings and the UI of a terminal client. This may be based on the terminal variant's needs, local variants' needs, operators' needs, operators' post-sales needs, vendors' post-sales needs, etc. The solution may also be used for dynamically changing the content within the application by providing tailored content, such as a tailored URL-link list, based on various attributes of either/both the end-user's preferences, the terminal's capabilities, the operator's, service provider's or other content retailer's preferences, and the like. The invention may further be used for updating old software versions of the terminal counterpart application, which provides the actual service. As described below, the invention may be used for providing an access point, or a more suitable/optimal access point, to the terminal. Additionally, the information within the CDB may be updated directly via the terminals' variant databases and/or operators' databases, through appropriate Application Programming Interfaces (APIs) provided by the CDB. Reports and statistical data regarding the usage of the system and, for example, the number of clients accessing it, may also be gathered. The invention facilitates these and other uses.

Figure 3:
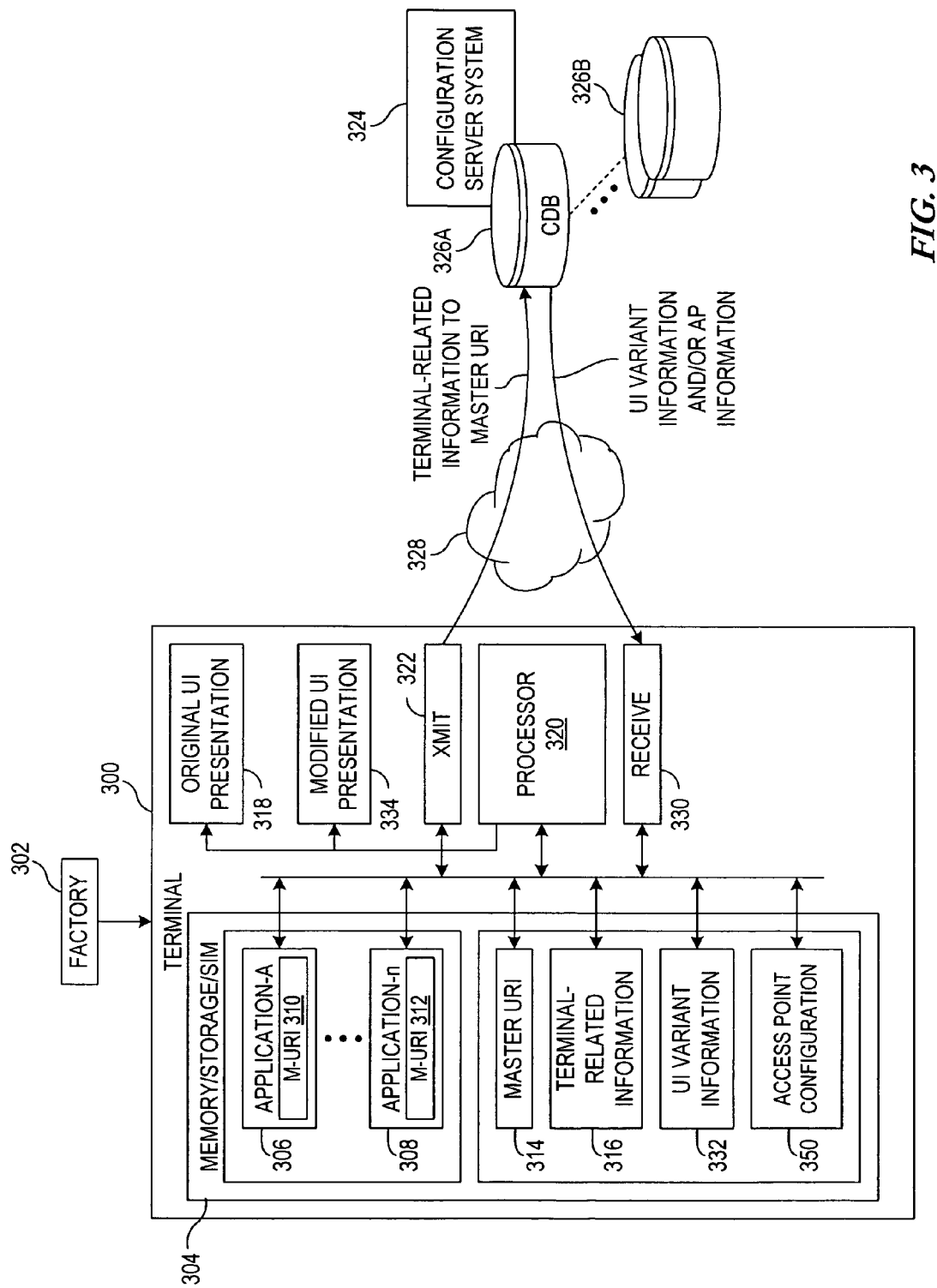
FIG. 3 is a block diagram illustrating one embodiment of representative terminal and configuration server systems in accordance with the invention.

FIG. 3 is a block diagram illustrating one embodiment of a terminal and configuration server system in accordance with the present invention. In the illustrated embodiment, a terminal 300 is received as provided by the factory 302 or other development/manufacturing facility. The terminal includes any type of memory/storage 304, which may include temporary or non-volatile memory/storage, and may be affixed or removable relative to the terminal 300. One or more clients/applications 306, 308 are provided with the terminal 300. A Master URI (M-URI) 310, 312 may be provided for each application 306, 308. Alternatively, one or more Master URIs 314 may be stored for individual or collective use with the applications 306, 308. Terminal-related information 316 is stored or otherwise accessible to the terminal 300.

Assume that Application-A 306 is invoked for the first time. An original UI presentation 318 as set by the factory 302 for that Application-A 306 is provided. For example, in the context of visual UI features, a terminal 300 display device (not shown) as controlled by a processor 320 can present a first, default UI presentation. In another embodiment, the original UI presentation may be no presentation (e.g., blank screen, etc.). When Application-A 306 is opened or otherwise initiated by the user the first time (or otherwise in association with a particular user attempt to invoke the application), the relevant Master URI 310, 314 is retrieved, and the terminal-related information 316 is sent via transmitter 322 to the configuration server system 324 and associated CDB 326A, which correspond to the Master URI, via a network(s) 328. As previously indicated, the configuration server system/CDB may be distributed, as represented by the one or more additional, or in some cases virtual, CDBs 326B.

In response to the terminal-related information, the relevant UI variant information for the accessing terminal 300 is retrieved from the CDB 326A/B. This information is received via the receiver 330 of the terminal 300, and can be stored or otherwise associated with Application-A 306 as represented by block 332. The processor 320 can execute the Application-A 306 using the UI variant information 332 to provide a modified UI presentation 334. For example, the visual presentation of the Application-A 306 may now include a skin or other UI modifications to provide a new UI from which the user of the terminal 300 can view and/or interact with.

Figure 4A:
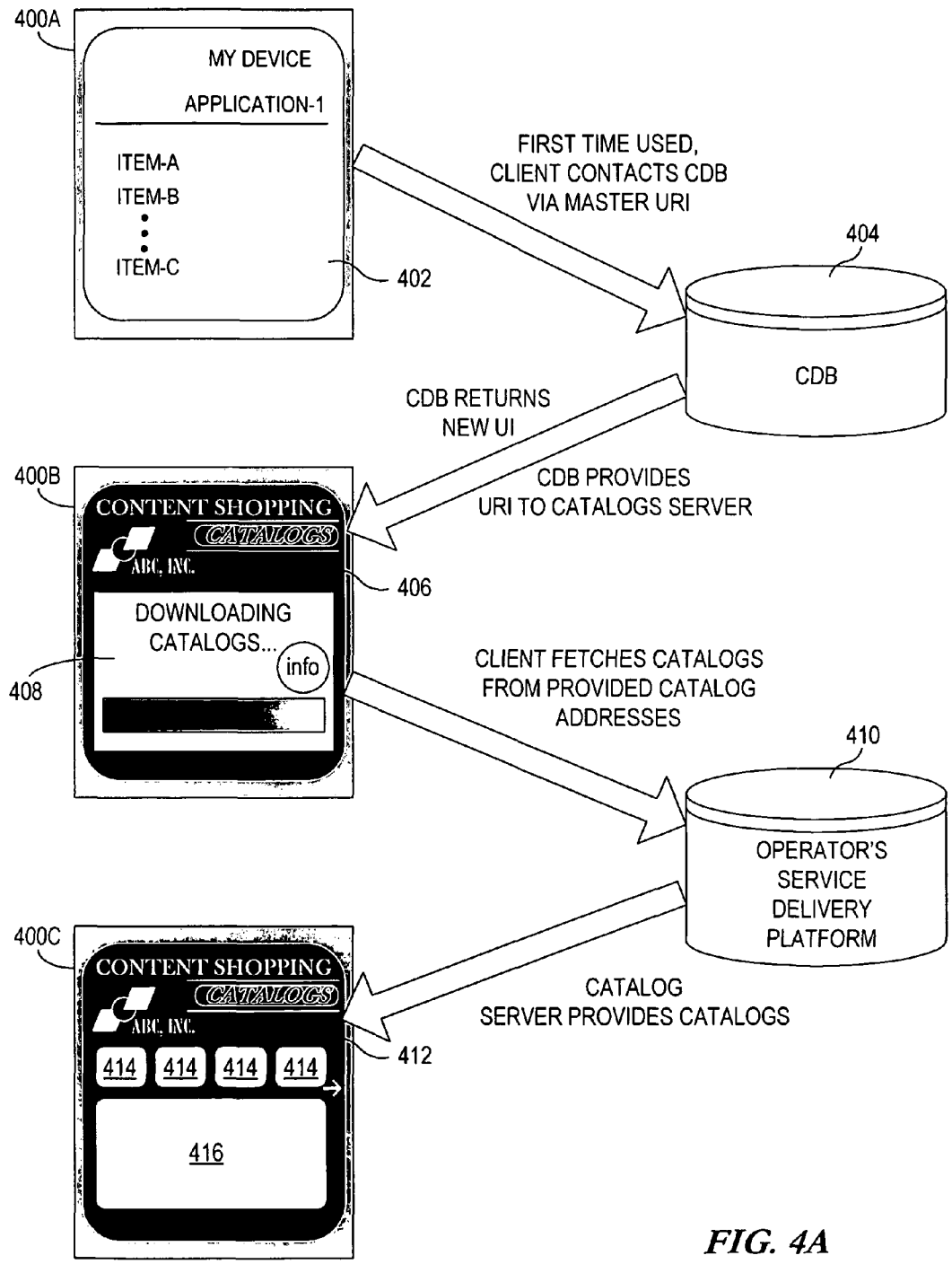
FIGS. 4A, 4B and 4C illustrate representative embodiments of the user interface (UI) variant infusion and access point configuration according to the invention.

As previously noted, the present invention may be used in connection with an online content catalog service(s). Such services may be implemented in accordance with systems as described herein, and/or as described in co-pending U.S. Publication Nos. 2005/0275566 and 2006/0015520, both of which are incorporated herein by reference in their entireties. In such a case, at least one of the applications/clients on the terminal to be impacted by the modified UI variants may be a catalog client. The CDB and/or associated database may include a master catalog serving as a catalog of mobile content, applications, services, etc. Developers can arrange to have their content, applications and services associated with a global and/or company-operated CDB to bring their solutions to any number of online retail storefronts. Different operators may have different offerings taken from the master catalog, whereby operator branded purchasing clients, portals, and other interfaces may be provided to users. The present invention allows such interfaces to be branded with operator and/or service provider characteristics, such as logos, icons, backgrounds, sounds, trademarks/service marks, colors, designs, etc., upon first use of such catalog clients. FIG. 4A provides a diagram of an exemplary embodiment of the UI variant infusion of the present invention, used in connection with a catalog client where content made available by a particular operator is presented to the user with the operator's preferred UI presented to the user.

As shown in FIG. 4A, a terminal display 400A may provide an original or default presentation 402 for the catalog client. This original/default client presentation 402 may be part of the base application—e.g., the default portion of the client installed at the factory for a volume of terminals shipped from the factory. Alternatively, the presentation 402 may be null or blank, in that the modified UI is obtained before any particular presentation is displayed. In any case, the first time that the catalog client is opened or otherwise used, the client contacts the CDB 404 using the Master URI previously described. The CDB 404 returns the new UI, namely the UI variant information that can be used to skin or otherwise modify the presentation. This new UI is displayed on the display 400B as presentation 406, which is different than the original/default presentation 402. In the case where the client is a catalog client as in the present example, the CDB 404 also provides the URI(s), i.e. address(es), to the catalogs server. The client fetches catalogs from the provided catalog address(es). During this time, a notification window 408 may be presented to notify the user and show the progress of the catalogs download. The catalogs are fetched from the operator's service delivery platform 410, which in turn provides the various catalogs and/or informational items as shown at presentation 412. Selectable catalogs and/or informational items are depicted for purposes of illustration at blocks 414, and block 416 represents an area for viewing more detailed information related to any one or more of the blocks 414.

It should be noted that applying the UI variant information to the terminal UI may occur at a time other than the initial return of information from the CDB 404. For example, the UI variants may be applied at the stage shown as presentation 412 rather than at the stage shown as presentation 406—i.e. at the time of providing the catalogs versus at the time of the client fetching the catalogs. As this example illustrates, the particular time at which the UI is actually modified at the user terminal using the UI variant information is not of particular significance.

Figure 4B:
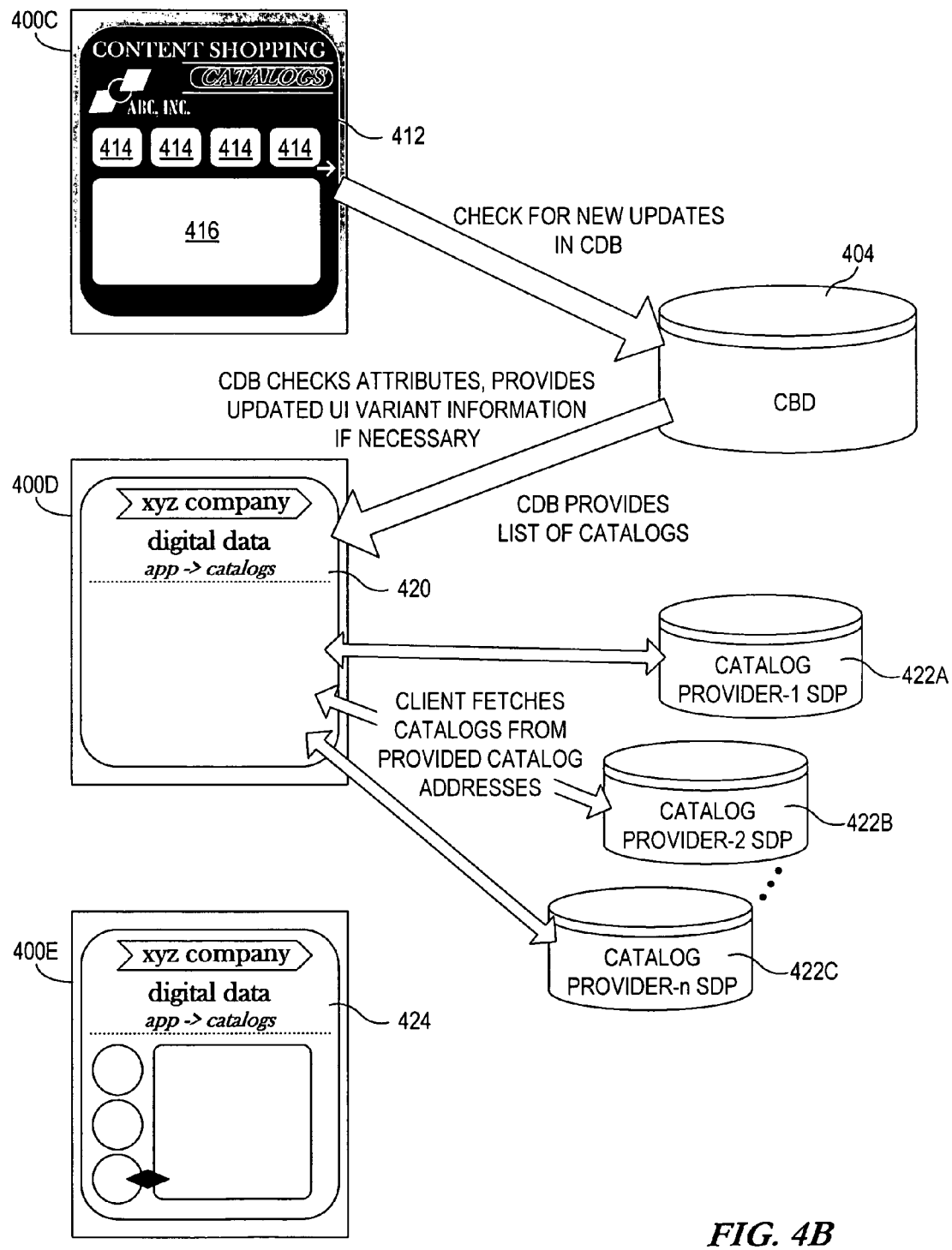

As was described in connection with FIG. 2, the present invention includes various optional features that may be used in connection with the present invention. One such feature is the periodic and/or event-triggering monitoring for UI variant updates in the CDB. For example, the operator, service provider and/or other entity may want to change any one or more of the colors, logos, icons, trademarks, or the like. Therefore, in addition to allowing the UI to be modified upon the first use of the particular client, subsequent updates are also possible in connection with the present invention. FIG. 4B provides a diagram of another exemplary embodiment of the UI variant infusion of the present invention, again described in terms of a catalog client for purposes of example only, where UI updates are made available to the terminal. Corresponding reference numbers between corresponding items in FIGS. 4A and 4B are used to facilitate an understanding of this feature of the invention.

FIG. 4B begins with presentation 412 as provided on the display 400C. The client, a catalog client in the present example, may check for updates of at least the UI variant information in the CDB 404. As was described in connection with FIG. 2, periodic and/or situation-triggered events may invoke subsequent queries to the configuration server system to check for updated UI variant and/or other CDB data. In connection with such a request, the client may again send a portion of all of the relevant terminal-related information or attributes to the CDB 404. The CDB checks these attributes and determines whether new UI variant information is available, and sends such new information if necessary. As shown at display 400D, new UI variant information is provided in the present example as shown by presentation 420. In the case where the client is a catalogs client, the CDB 404 provides a list of catalogs. In the present example, the client fetches the catalogs from different catalog providers 422A, 422B, 422C addressable by given particular addresses. These catalog providers may include service delivery platforms (SDP) hosted and managed by various entities. When the client has fetched the appropriate catalog(s), it can be displayed or otherwise presented, as shown at display 400E and corresponding presentation 424. As can be seen from the foregoing examples of FIGS. 4A and 4B, operator-specific, service provider-specific and/or other entity-specific user interfaces may be provided to the terminal upon first use of the associated client on the terminal.

As indicated above, another aspect of the invention involves manners of dynamically configuring access point settings for applications operable on a terminal. For example, a method that may be implemented in accordance with the principles of the invention involves a manner of dynamically associating particular access point settings with a terminal, and/or with particular applications on the terminal. As with the embodiments described above, this embodiment provides for a modification on the terminal by transmitting terminal-related information (including access point information), receiving appropriate variant information that is derived from the transmitted terminal-related information, and modifying a configuration of the mobile terminal based on the received variant information. This aspect of the invention is described below. It should be noted that the following embodiments may be practiced collectively with, or independent of, the aforementioned embodiments.

An "access point" as used herein generally refers to the point where a terminal connects to a network; i.e., a network element through which the terminal can gain access to a particular network or set of networks. For example, an Access Point Name (APN) is the name given to an access point for General Packet Radio Service (GPRS) data communication, where a Gateway GPRS Support Node (GGSN) may serve as the access point. Another example of an access point is a Wireless Local Area Network (WLAN) access point. The invention applies to these and other access points which facilitate communication with a network(s).

As previously indicated, certain terminal-related information may be used to identify the appropriate information in the CDB of the configuration server system. For example, the terminal-related information may include information for determining the terminal type and characteristics, or may also/instead include information to determine the operator and/or service provider. Terminal-related information that may be used to identify the operator, service provider, Mobile Virtual Network Operator (MVNO) or other such entity includes, for example, the Mobile Country Code (MCC), Mobile Network Code (MNC), Service Provider Name (SPN), Short Message Service Center (SMSC) numbers and the like. However, the current access point information at the terminal may additionally, or instead, be used to identify the operator, service provider, MVNO, etc. For example, some access points are specific to a particular operator or MVNO, thereby enabling the current access point name to specifically identify the entity. This may be important, as distinguishing MVNO operators' subscribers from other MVNO operators operating in the same network or the network operator's subscribers is not possible with plain MCC and MNC mapping. Thus, one embodiment of the present invention utilizes the access point information at the terminal to identify certain information at the configuration server system.

When an application/client (where application and client are used synonymously herein) connects to multiple servers, the optimal access point might not be the same for all of the servers that the application can or will connect to. Thus, a single access point may not be optimal, or in some cases may not be desirable or even suitable, for certain service providers, operators, etc. For example, a Wireless Application Protocol (WAP) access point may not be a suitable or optimal access point for a service provider providing streaming audio, or a service provider providing a content catalog service, etc. Other examples include that some servers may require connecting through a specific access point for certain reasons such as to obtain needed authentication information from a WAP-proxy for billing, or the access point has limitations on how large the content is that is transferred through it, or due to specific arrangements made with the operator, or the like. Further, current solutions do not allow for the selection of a more suitable or desirable access point for a particular operator. For these and other reasons, the default access point settings used by an application on a terminal may not be optimal or even suitable. The invention allows for the dynamic over-the-air (OTA) configuration of access point settings of a terminal's application.

The invention thus provides a solution that can be used to, for example, deliver access point information dynamically and/or to optimize an access point that may be operable but is not the optimal access point. This can be used for various purposes, including but not limited to using the primary connection's access point information and/or a set of other access point information to define the serving operator (e.g., MVNOs); configuring and/or optimizing default access point settings for all servers for subsequent session connections within the same application, and dynamically OTA; configuring specific access point settings for each server the application connects dynamically; etc. These and other contemplated overriding access point settings may be intended to temporarily override existing access point settings; to permanently override those settings; to override those settings until a subsequent overriding access point setting; etc. In one embodiment, a plurality of access point settings may be provided to the terminal, where each of these sets of access point settings is prioritized such that preferred access point settings will be used unless some event (e.g., preferred access point is not available) causes a set of access point settings of lower priority to be used. The representative, exemplary use cases listed above may be based on, but are not limited to, the needs of any one or more of the operator(s), service provider(s), application vendor(s), end user(s), terminal vendor(s), etc.

As will be described more fully below, the present invention provides numerous advantages. For example, the invention allows the most optimal (from a cost, time, etc. standpoint) access point to be dynamically set for a terminal application after the application has been installed on the terminal. As another example, server-specific optimal access points, either mandatory or optional, can be set on the application dynamically after it has been installed on the terminal; e.g., a large video service may prefer to use a WLAN access point, a server can force the usage of network-based authentication such as a WAP proxy, etc. Another exemplary advantage is that the invention allows usage of multiple servers when their access point preferences are conflicting. Still another representative advantage is that different pricing models can be used. For example, an operator can boost its services by advertising that its transport is free of charge, whereas some other service provider who provides identical content can only provide access through a charge-based access point. The solution enables flexible post-sales configuration of access point settings, and increases the value of the terminal or application to customers as well as to operators or retailers who sell mobile content and may want to optimize their own service in the large existing terminal base. The present invention provides these and other advantages.

Figure 5:
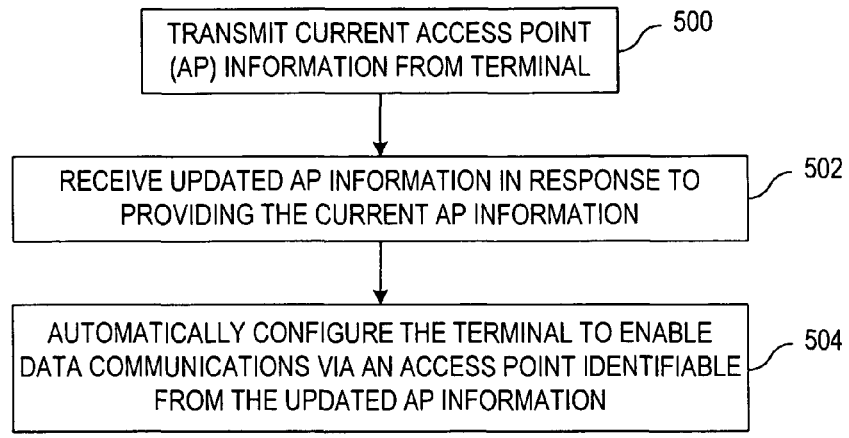
FIG. 5 illustrates an embodiment of the invention which facilitates the configuration of access points in a terminal.

Referring now to FIG. 5, one embodiment of a method according to the present invention is illustrated. The illustrated method facilitates the configuration of access points in a terminal. The terminal provides 500 some access point information currently known at the terminal. The terminal may transmit 500 this information to a network, where an appropriate network element can receive it. In response, the terminal receives 502 new or "updated" access point information, although it is possible that this updated access point information is the same as what the terminal previously had for access point information. This updated access point information includes at least some information regarding an access point setting for the terminal to use when connecting to a network element(s). The terminal is then automatically configured 502 to enable data communications via an access point identifiable from the updated access point information. An access point that is "identifiable" from the updated access point information includes an access point that is directly identified via the updated access point information, as well as an access point that can be indirectly determined from the updated access point information.

Figure 6:
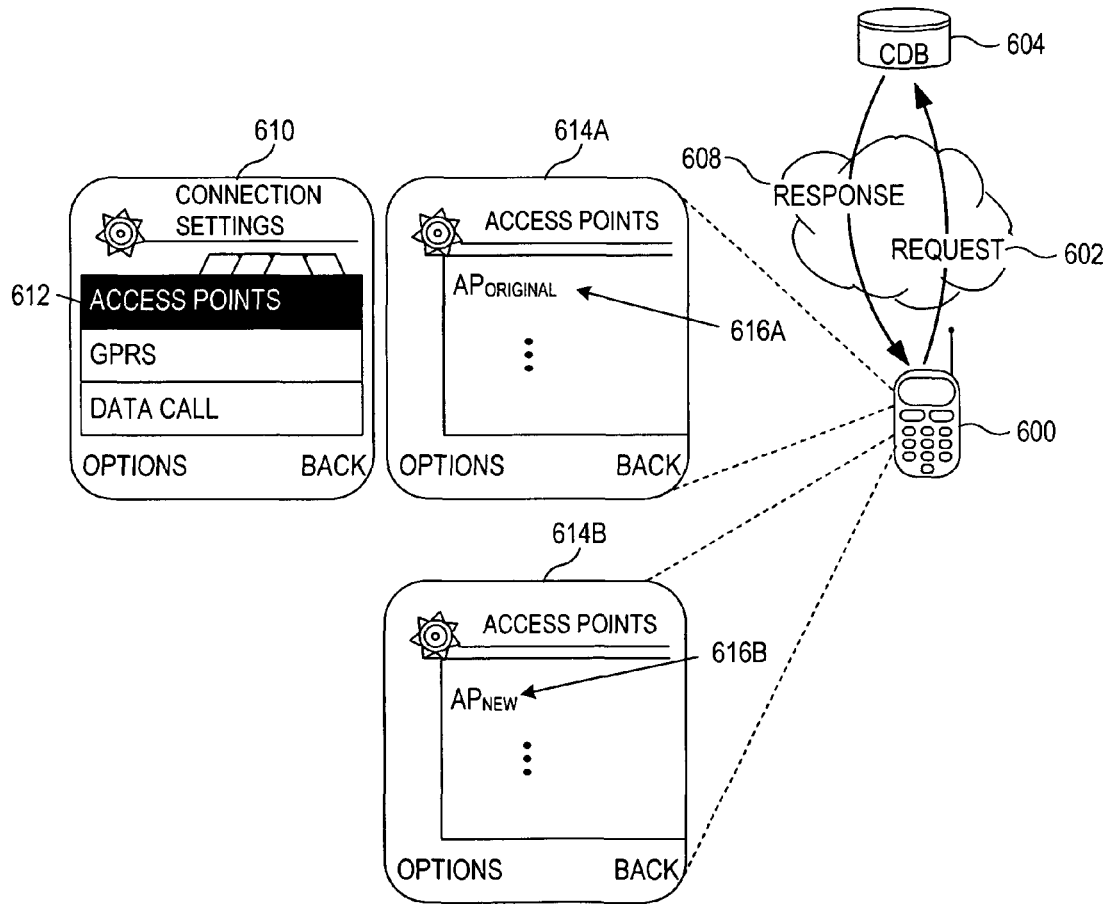
FIG. 6 illustrates an embodiment where a mobile device communicates with a configuration server system to obtain the appropriate access point information.

FIG. 6 generally illustrates an embodiment where a mobile device 600 represents the terminal. The mobile device 600 can transmit the current access point information via a request 602 to a CDB 604. More particularly, one embodiment involves the client/application at the mobile device 600 contacting the CDB 604 using a Master URI as previously described, and transmitting a request 602 that includes some current access point information. This current access point information may be used to exclusively, or cooperatively with other terminal-related information, identify the operator, service provider, and/or other entity. In other embodiments, the request may simply notify the CDB 604 or other analogous network element that updated access point information is needed, without transmitting any specific, current access point information. However, in the illustrated embodiment it is assumed that the CDB 604 obtains information from its database regarding the current active access point of the terminal, and optionally may receive a set of all available access point settings in the request 602.

The representative terminal screen images illustrate how the user can know at least some of the current access point information. For example, the mobile device 600 may provide a user interface (UI) screen 610 to present connection settings, which may include access points 612. Selecting the access point option 612 may present a list of any current access points, as shown at UI screen 614A. As shown at access point information item 616A, an identifier, such as the APN labeled $AP_{ORIGINAL}$, is shown as at least some of the current access point information for the mobile device 600.

In response to the request 602, the CDB 604 provides a response 608. This response may include variations of updated access point information. One type of updated access point information is a default access point setting proposal to the client at the mobile device 600. In some embodiments, the mobile device 600 may be automatically configured to enable data communications via an access point identified by this default access point setting. In other embodiments, the mobile device 600 may selectively utilize or disregard the updated access point proposal. Where the mobile device 600 automatically or manually accepts the updated access point information, the mobile device 600 will utilize an access point identifiable by the updated access point information. The device user may see such a change via the UI screen 614B, where the access point information item 616B illustrates the updated APN labeled $AP_{NEW}$.

It should be noted that in some embodiments, the mobile device 600 may send a request 602 to the CDB 604 in response to a triggering event. One such embodiment is the initial activation of an application. For example, when a client/application is invoked on the mobile device 600, this may trigger the request 602 to the CDB 604 to obtain optimal or otherwise updated access point information. In other embodiments, such requests 602 can be sent when desired by the user, or in response to other triggering events.

FIG. 7 illustrates a block diagram of a particular embodiment of the invention. In FIG. 7, the client 700 represents an application residing or otherwise operable on a terminal. Information, which may be in the form of a request, is sent to the configuration database (CDB) 702. As previously indicated, the information sent to the CDB 702 may include terminal type/characteristics, access point information, etc. For example, the information may include User Agent Profile (UAProf) information, MCC, MNC, SPN, SMSC numbers, IMEI, UID, language selection, roaming indicator, etc.

In accordance with the invention, current access point information may also be provided to the CDB 702. The access point information may include the current access point used by the client 700, and/or optionally may include a set of all active access point information (e.g., all available access point settings). This information may be used by the CDB 702 to identify the operator or other entity, and/or may be used to determine the proper updated access point information to return to the client 700. A number of interfaces to the CDB 702 are illustrated, including the client XML interface 704, administration interface 706, and operator web interface 708.

The CDB 702 can provide various information to the client 700 as previously described. This information may include any of a catalog list, client updates, UI updates or the like. In another embodiment, updated access point information may be provided to the client 700 alone, or may be provided with any one or more of the other information such as catalog list, client updates, etc. In one embodiment, this additional information sent to the client 700 is used by the client 700 as the default access point setting when subsequently connecting.

In one representative embodiment the client 700 is a catalog client (such as described in connection with FIGs. 4A and 4B). In this case the CDB 702 may return a list of catalog URLs based on at least some of the terminal-related information sent to the CDB 702. In one embodiment, each catalog or groups of catalogs may have access point settings associated with it. For example, a first access point may be associated with a first catalog, and a second access point may be associated with a second catalog. This information may be returned to the catalog client 700, to allow the terminal to connect to the appropriate access point depending on which catalog is being accessed. This is generally illustrated in FIG. 8A, where the terminal 800 sends a request 802 to the CDB 804, which responds with updated access point information 806. The terminal 800 can then access the service provider 808 (e.g., catalog server in the present example) by way of a new access point 810, $AP_{NEW}$, identified by the updated access point information 806.

In other embodiments, the catalog server(s) itself can request that the client 700 use certain access point settings. Referring to FIG. 8B, servers other than the CDB 804 may provide updated access point information to the client terminal 800. In such cases, the CDB 804 may provide, for example, catalog information 812. The terminal 800 can contact the service provider 808 via a current access point shown as $AP_{ORIGINAL}$ 814, and the service provider 808 can provide a catalog-specific access point setting 816. Using this information, the terminal 800 can connect to the service provider (and/or other service provider) using new access point information, depicted as $AP_{NEW}$.

Figure 9:
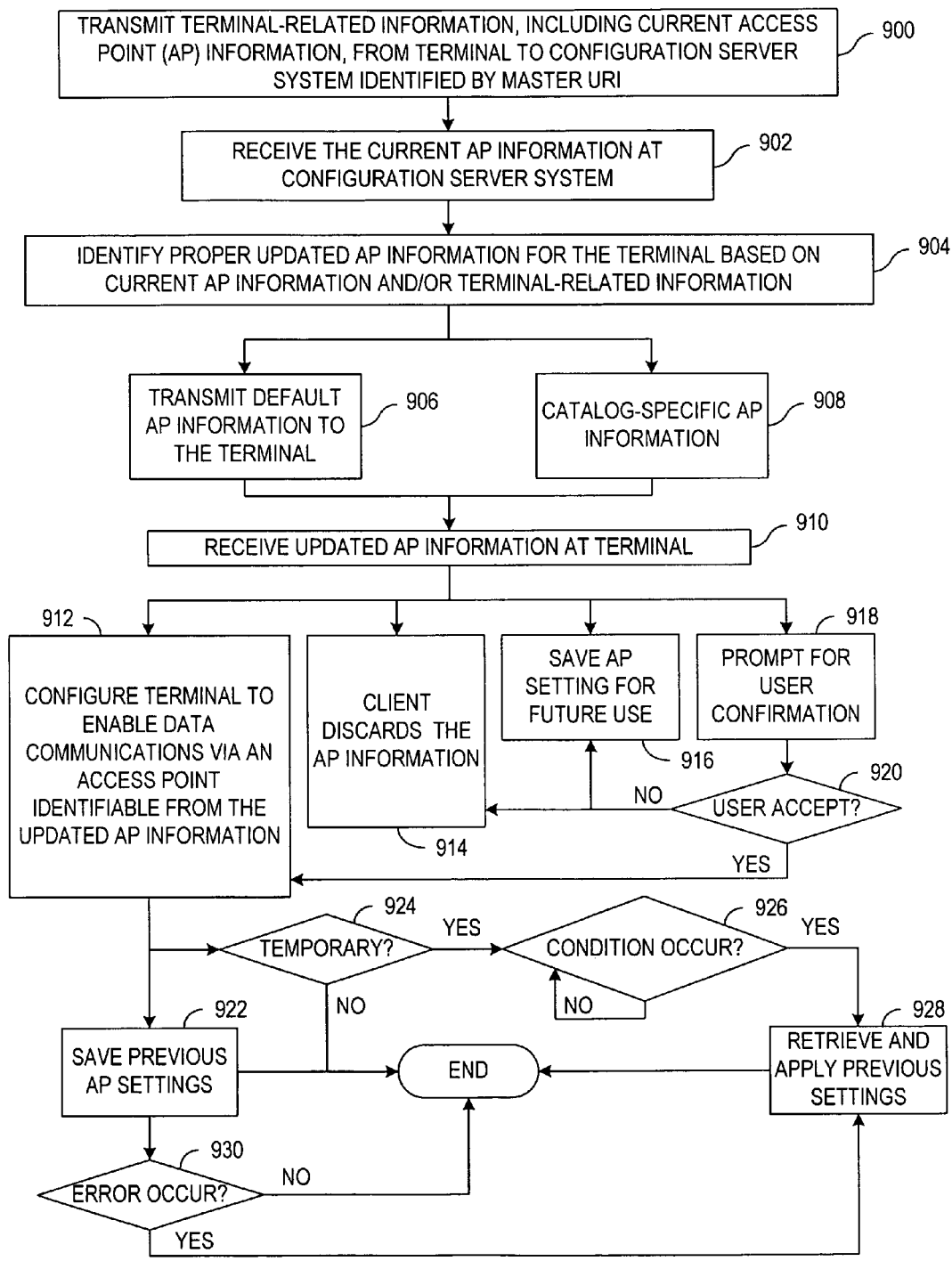
FIG. 9 is a flow diagram illustrating various representative embodiments of manners in which terminal access points can be configured in accordance with the present invention.

FIG. 9 is a flow diagram illustrating various representative embodiments of manners in which terminal access points can be configured in accordance with the present invention. In the illustrated embodiment, terminal-related information is transmitted 900 from the terminal to a configuration server system identified by a Master URI. The terminal-related information in the illustrated embodiment includes at least some current access point (AP) information at the terminal. The current access point information is received 902 at the configuration server. The configuration server system identifies 904 the proper updated access point information for the terminal, based on the current access point information and/or the other terminal-related information. In one embodiment, default access point information is transmitted 906 to the terminal. In another embodiment, application-specific access point information is provided to the terminal, such as, for example, catalog-specific access point information as shown at block 908. One embodiment of the invention utilizes the default access point setting of block 906 for all connections, except where there is an application-specific access point setting for a particular application(s) as shown at block 908. Application-specific settings may be mandatory or optional. For example, where the application-specific settings are optionally used, it may be provided as a "recommendation" whereby the end user or the client (based on determinative input) can override the recommendation.

The terminal receives 910 the updated access point information. When the access point information is received at the terminal, a number of different actions may occur. FIG. 9 illustrates some of these different actions. In one embodiment, the terminal is automatically configured 912 to enable data communications via an access point identifiable (including being directly provided) from the updated access point information. In another embodiment, the client determines that the updated access point information is not desired or otherwise cannot be used, in which case the client discards 914 or otherwise disregards the new access point information. In one embodiment, the client may save 916 the new access point setting for future use. This storing of the new access point setting for future use may be performed whether or not the new access point setting is allowed to replace any current access point setting when the new access point information is received. In still another representative embodiment, the client may prompt 918 the user for confirmation as to whether the user would like to update the current access point setting with the newly provided access point setting. If the user does not accept the new setting, nothing further may happen, or the client may discard 914 the updated access point information, or the new access point setting may be saved 916 for future use, etc. If the user does accept the new access point setting, the terminal is then configured 912 to enable communications via the access point provided by or otherwise identified by the updated access point information.

In one embodiment, the access point settings active prior to configuring the terminal with the updated access point information are stored 922. The prior settings may be stored for various reasons, such as where the new access point setting does not function properly. For example, if an error occurs 930, the previous settings may be retrieved and applied as shown at block 928.

In another embodiment, saving the previous settings may be used to later revert back to the prior access point settings where the updated access point information was only to be used temporarily. For example, if the updated access point information of block 912 is to be used only temporarily as determined at decision block 924, it may then be determined 926 whether the condition occurs that would cause the previous settings to be reapplied. If such a condition occurs, the previous settings are retrieved and applied 928. Such conditions include, for example, a time duration, particular dates and/or times, specific events at the content server (e.g., redirect via different access point during holiday shopping or periods of high volume), a particular number of connections or within a range of connections using the updated access point settings, etc. In any of these or other similar cases, the previous access point settings can be stored so they can be later retrieved 928 when the temporary change has expired.

It should also be noted that the updated access point information can include more than one access point setting. For example, the CDB may identify two, three or more access points and provide the list to the terminal. These multiple access point settings can each be associated with a priority, such as being transmitted in an order of priority or otherwise assigned a relative priority. This allows the terminal to attempt to use the highest priority access point information, or perhaps to decide not to use the highest priority access point information, while providing one or more backup access point settings that can be used. For example, a plurality of access point settings may be provided to the terminal in a list of priority order, such as a WLAN access point being the highest priority access point, but if that is unavailable then the next priority access point will be used.

Referring back to FIG. 3, the terminal 300 used in connection with the present invention may include one or more clients/applications 306, 308. A Master URI (MURI) 310, 312 may be provided for each application 306, 308. Alternatively, one or more Master URIs 314 may be stored for individual or collective use with the applications 306, 308. Terminal-related information 316 is stored or otherwise accessible to the terminal 300.

In accordance with the invention, the memory/storage 304 also includes the current access point information 350. While this information 350 is shown separately from the terminal-related information, this does not suggest that the access point information 350 may not be considered part of the terminal-related information. It should also be noted that although the current access point information may be sent to the configuration server system 324 when an application 306, 308 is invoked for the first time, this information may be sent at any time and is not limited to any first activation of an application.

Assume an embodiment where the access point information for an application, Application-A 306, is transmitted from the terminal 300 when the Application-A 306 is first invoked. In this embodiment, the relevant Master URI 310, 314 is retrieved, and at least the access point information 350 is sent via transmitter 322 to the configuration server system 324 and associated CDB 326A, which correspond to the Master URI, via a network(s) 328. As previously indicated, the configuration server system/CDB may be distributed, as represented by the one or more additional, or in some cases virtual, CDBs 326B. In response to the terminal-related information, the updated access point information for the accessing terminal 300 is retrieved from the CDB 326A/B. This information is received via the receiver 330 of the terminal 300, and can be stored as the updated access point information. The prior state of the access point information can also be stored (not shown). The processor 320 can execute the Application-A 306 and communicate over the network 328 using the access point settings provided by configuration server system 324.

Figure 4C:
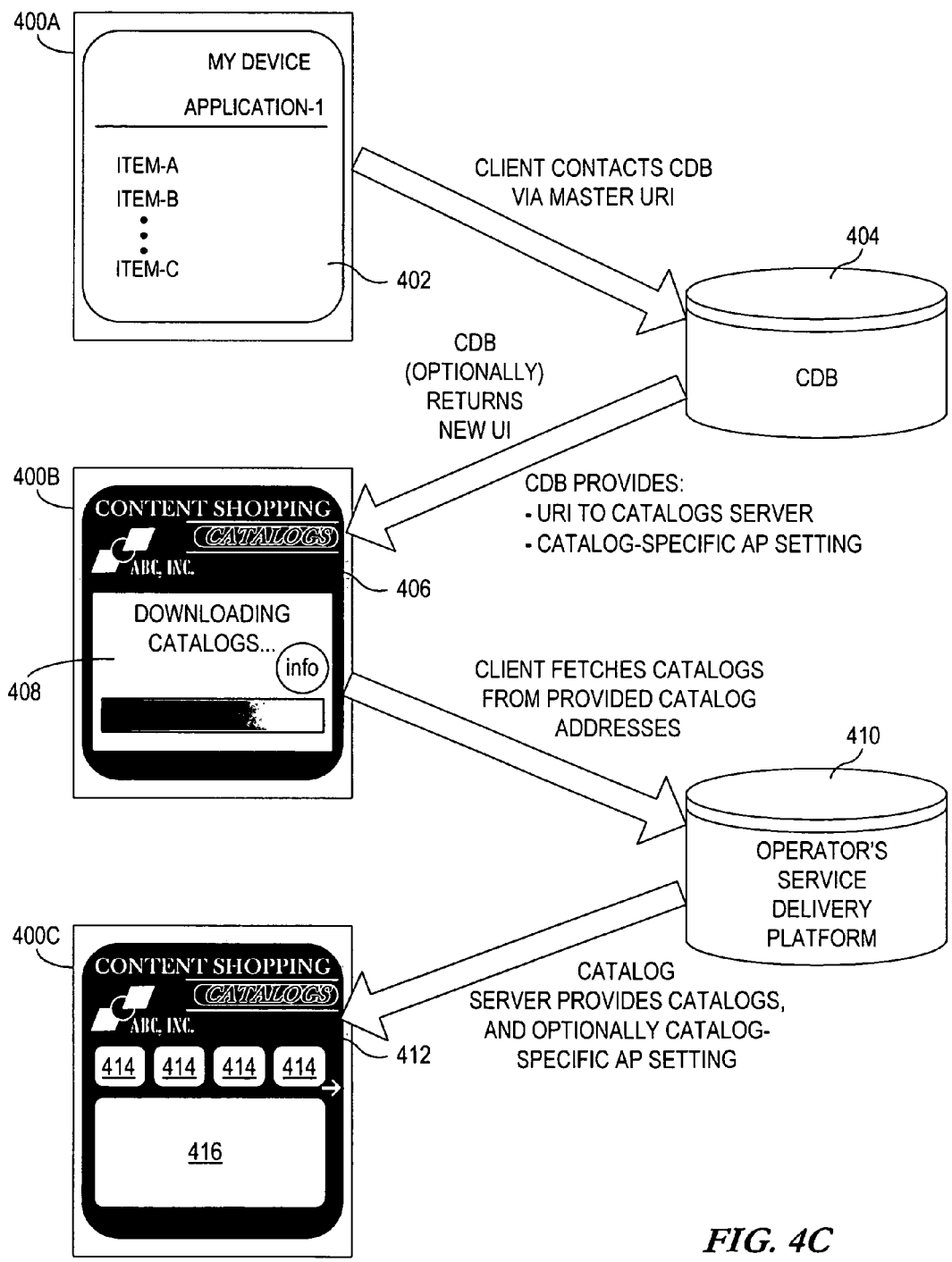

As previously noted, the present invention may be used in connection with an online content catalog service(s). Such services may be implemented in accordance with systems as described herein, and/or as described in co-pending U.S. Publication Nos. 2005/0275566 and 2006/0015520, both of which are incorporated herein by reference in their entireties. In such a case, at least one of the applications/clients on the terminal may be a catalog client. The CDB and/or associated database may include a master catalog serving as a catalog of mobile content, applications, services, etc. FIGS. 4A and 4B relate to embodiments where UI variants are applied in connection with a catalog client. The access point configuration system and methodology of the present invention may also be used in connection with such a catalog client, as previously described. FIGS. 4C and 4D illustrate embodiments similar to those of FIGS. 4A and 4B, but concern the configuration of access point information for particular catalog clients or groups of catalog clients.

As shown in FIG. 4C, the client contacts the CDB 404 using the Master URI previously described. In the case where the client is a catalog client as in the present example, the CDB 404 provides the URI(s), i.e. address(es), to the catalogs server(s). Further, in accordance with the present invention, the CDB 404 may also provide catalog-specific access point settings. Thus, to access a particular catalog at a particular server(s), particular access point settings may be required, or desired. The CDB 404 can therefore respond with a catalog-specific access point setting along with the URI to the catalogs server. The client fetches catalogs from the provided catalog address(es), using the access point provided by the CDB 404. During this time, a notification window 408 may be presented to notify the user and show the progress of the catalogs download. The catalogs are fetched from the operator's service delivery platform 410, which in turn provides the various catalogs and/or informational items as shown at presentation 412. Selectable catalogs and/or informational items are depicted for purposes of illustration at blocks 414, and block 416 represents an area for viewing more detailed information related to any one or more of the blocks 414.

The catalog server provided by way of the operator's service delivery platform may provide the catalog-specific access point settings rather than the CDB 404 providing this information. In another embodiment, the CDB 404 may provide a default access point setting, and one or more of the catalog server(s) provide catalog-specific access point settings to be used instead of the default access point setting. A more particular example can be envisioned by reference to FIG. 4B, where any one or more of the catalog providers 422A, 422B, 422C can provide catalog-specific access point settings to the client. These are merely representative examples, and those skilled in the art will appreciate that other alternatives are equally applicable.

Figure 10:
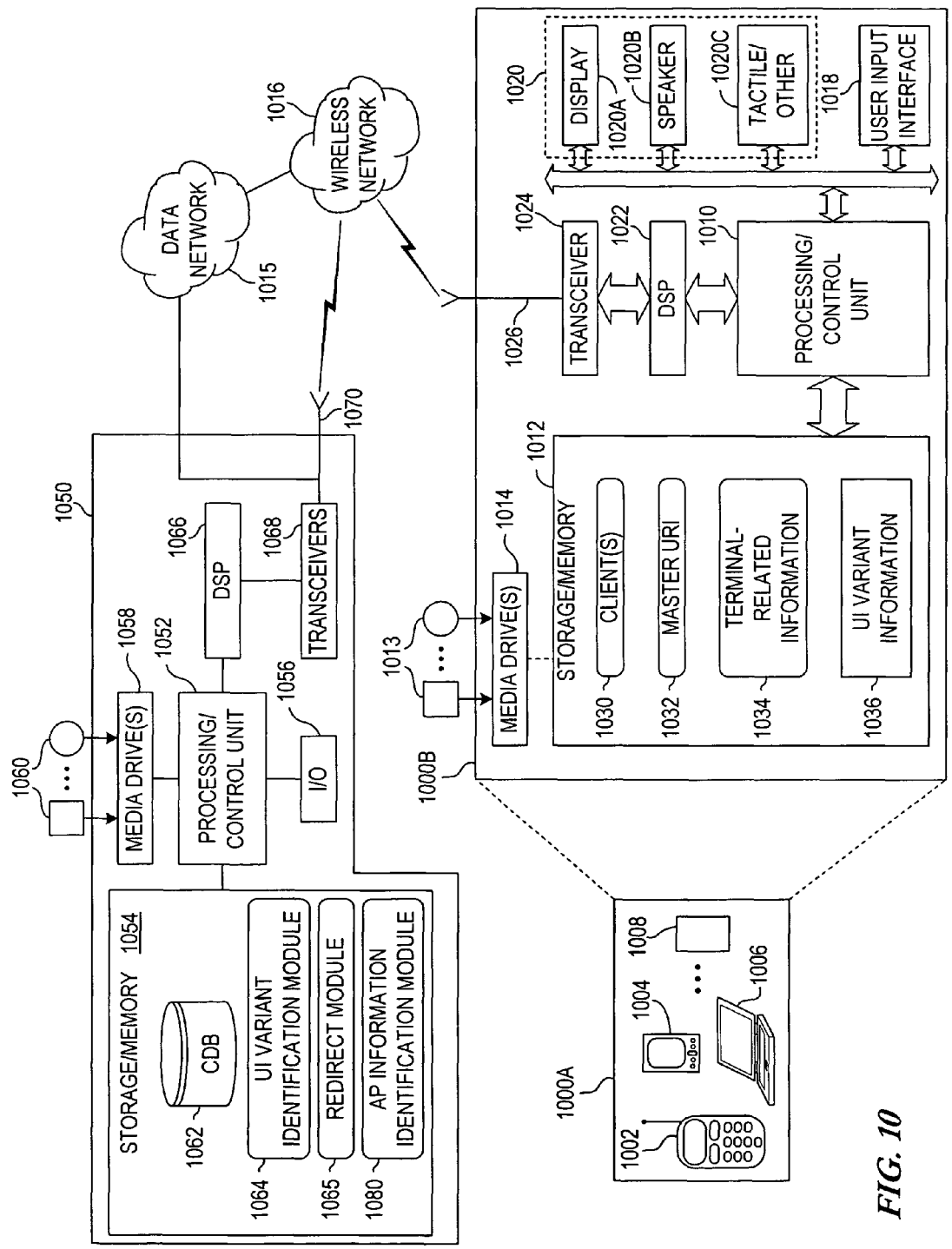
FIG. 10 illustrates a representative system in which the present invention may be implemented or otherwise utilized.

Hardware, firmware, software or a combination thereof may be used to perform the functions and operations in accordance with the invention. The terminals in accordance with the invention include any communication device capable of communicating over-the-air (OTA) with wireless networks and/or capable of communicating via wired networks. Such terminals include, for example, mobile phones, Personal Digital Assistants (PDAs), computing devices, and other networked terminals. A representative system in which the present invention may be implemented or otherwise utilized is illustrated in FIG. 10, where the terminal is represented as a wireless terminal capable of communicating information OTA.

The system includes one or more terminals 1000A such as, for example, a mobile phone 1002, PDA 1004, computing device 1006, or other communication device 1008 capable of OTA communication. The terminal 1000A utilizes computing systems to control and manage the conventional device activity as well as the functionality provided by the present invention. For example, the representative terminal 1000B includes a processing/control unit 1010, such as a microprocessor, controller, reduced instruction set computer (RISC), or other central processing module. The processing unit 1010 need not be a single device, and may include one or more processors. For example, the processing unit may include a master processor and one or more associated slave processors coupled to communicate with the master processor.

The processing unit 1010 controls the basic functions of the terminal 1000B as dictated by programs available in the program storage/memory 1012. The storage/memory 1012 may include an operating system and various program and data modules associated with the present invention. In one embodiment of the invention, the programs are stored in non-volatile electrically-erasable, programmable read-only memory (EEPROM), flash ROM, etc., so that the programs are not lost upon power down of the terminal. The storage 1012 may also include one or more of other types of read-only memory (ROM) and programmable and/or erasable ROM, random access memory (RAM), subscriber interface module (SIM), wireless interface module (WIM), smart card, or other fixed or removable memory device/media. The programs may also be provided via other media 1013, such as disks, CD-ROM, DVD, or the like, which are read by the appropriate media drive(s) 1014. The relevant software for carrying out terminal operations in accordance with the present invention may also be transmitted to the terminal 1000B via data signals, such as being downloaded electronically via one or more networks, such as the data network 1015 or other data networks, and an intermediate wireless network(s) 1016.

For performing other standard terminal functions, the processor 1010 is also coupled to user input interface 1018 associated with the terminal 1000B. The user input interface 1018 may include, for example, a keypad, function buttons, microphone, joystick, scrolling mechanism (e.g., mouse, trackball), touch pad/screen, or other user entry mechanisms (not shown). These and other user input components are coupled to the processor 1010 as is known in the art.

A user interface (UI) 1020 is provided, which allows the user of the terminal 1000A/B to perceive information visually, audibly, through touch, etc. For example, one or more display devices 1020A may be associated with the terminal 1000B. The display 1020A can display the original/default and/or modified presentations as previously described. A speaker(s) 1020B may be provided to present audible information. For example, a tone or other sound associated with a particular operator's brand may be included with the UI variant information, and played when the user activates the client that has been skinned or otherwise modified with that operator's UI information. Other user interface (UI) mechanisms can also be provided, such as tactile 1020C or other feedback. The UI variant information and/or access point information may provide any type of presentation perceivable by the user.

The illustrated terminal 1000B also includes conventional circuitry for performing wireless transmissions over the wireless network(s) 1016. The DSP 1022 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 1024 includes at least a transmitter and receiver, thereby transmitting outgoing radio signals and receiving incoming radio signals, generally by way of an antenna 1026.

In one embodiment, the storage/memory 1012 stores the various client programs and data used in connection with the present invention. For example, the storage/memory 1012 includes storage to store the client programs/applications 1030. The storage/memory 1012 stores the Master URI(s) 1032 that notifies the terminal 1000B of the address of the configuration server system/CDB. The storage/memory 1012 also includes the terminal-related and access point (AP) information 1034 as described above. Upon receiving the UI variant and/or access point information from the CDB, the information 1036 provided in response may be temporarily or permanently stored. These client and data modules are representative of the types of functional and data modules that may be associated with a terminal in accordance with the invention, and are not intended to represent an exhaustive list.

FIG. 10 also depicts a representative computing system 1050 operable on the network for identifying and providing at least the updated access point information, and optionally other information such as catalog information or other information associated with the particular application. In one embodiment of the invention, the computing system 1050 represents the configuration server system previously described.

In one embodiment, the computing system 1050 represents the configuration server system previously described. The server system 1050 may be a single unit, or a distributed system. In one embodiment of the invention, the configuration server system is distributed to multiple locations, and may be a globally distributed system. Although the server is distributed to multiple locations, one embodiment involves replicating the database, i.e. each node provides some or all of the same services. This ensures, among other things, redundancy in the event that a node(s) has failed.

The computing system/server 1050 includes a processing arrangement 1052, which may be coupled to the storage/memory 1054. The processor 1052 carries out a variety of standard computing functions as is known in the art, as dictated by software and/or firmware instructions. The storage/memory 1054 may represent firmware, media storage, and/or memory. The processor 1052 may communicate with other internal and external components through input/output (I/O) circuitry 1056. The computing system 1050 may also include media drives 1058, such as hard and floppy disk drives, CD-ROM drives, DVD drives, and other media 1060 capable of reading and/or storing information. In one embodiment, software for carrying out the operations at the computing system 1050 in accordance with the present invention may be stored and distributed on CD-ROM, diskette, removable memory, or other form of media capable of portably storing information, as represented by media devices 1060. Such software may also be transmitted to the system 1050 via data signals, such as being downloaded electronically via a network such as the data network 1015, Local Area Network (LAN) (not shown), wireless network 1016, and/or any combination thereof.

In accordance with one embodiment of the invention, the storage/memory 1054 and/or media devices 1060 store the various programs and data used in connection with the present invention. For example, the single or distributed CDB 1062 includes the UI variant information and/or the updated access point information, and optionally other data that the requesting client may need for the particular application. The optional UI variant identification module 1064 represents the software/firmware or other program information that is operable in connection with the processing control unit 1052 to identify the appropriate UI variant information for a particular requesting client.

Similarly, the access point information identification module 1080 represents the software/firmware or other program information that is operable in connection with the processing control unit 1052 to identify the appropriate updated access point information for the terminal or the particular requesting client(s). The access point information identification module 1080 may include, for example, a database indexing program(s) that uses the received current access point information 534, and optionally some of the terminal-related information, to identify the appropriate updated access point information stored in the CDB 1062. The access point information identification module 1080 may alternatively or additionally include comparison functionality to compare certain received current access point information and optionally terminal-related information to stored information to identify the appropriate new access point information stored in the CDB 1062. Any desired manner of locating the appropriate access point information stored in the CDB 1062 using the current access point information 534 may be employed.

The storage/memory 1054 and/or other media devices 1060 may also include a redirect module 1065, which is operable with the processor 1052 to redirect the query and terminal-related information to any other desired URI. If redirection is to be employed in this fashion, the configuration server system 1050 redirects the information to the other URI to be processed in the manner that the configuration server system 1050 would otherwise have processed the information in accordance with the invention. Such redirection facilitates the creation of CDB subsystems, such as virtual CDBs within the global CDB system, that are dedicated to different purposes, and that can ensure flexible scalability.

The illustrated computing system 1050 also includes DSP circuitry 1066, and at least one transceiver 1068 (which is intended to also refer to discrete transmitter/receiver components). While the server 1050 may communicate with the data network 1015 via wired connections, the server may also/instead be equipped with transceivers 1068 to communicate with wireless networks 1016 whereby an antenna 1070 may be used.

Using the foregoing specification, some embodiments of the invention may be implemented as a machine, process, or article of manufacture by using standard programming and/or engineering techniques to produce programming software, firmware, hardware or any combination thereof. Any resulting program(s), having computer-readable program code, may be embodied within one or more computer-usable media such as memory devices or transmitting devices, thereby making a computer program product, computer-readable medium, or other article of manufacture according to the invention. As such, the terms "computer-readable medium," "computer program product," or other analogous language are intended to encompass a computer program existing permanently, temporarily, or transitorily on any computer-usable medium such as on any memory device or in any transmitting device.

For example, one embodiment of the invention includes a computer-readable medium having instructions stored thereon that are executable by a computing system for initiating the access point settings concept. Another embodiment includes a computer-readable medium having instructions stored thereon that are executable by a computing system for providing the access point setting to a requesting terminal in response to receiving current access point information.

From the description provided herein, those skilled in the art are readily able to combine software created as described with appropriate general purpose or special purpose computer hardware to create a computing system and/or computing subcomponents embodying the invention, and to create a computing system and/or computing subcomponents for carrying out the method of the invention.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method comprising:
   transmitting at least current access point information from a terminal, wherein the current access point information includes terminal-related information that is specific to the terminal;
   receiving updated access point information specific to the terminal in response to providing the current access point information, wherein the updated access point information is determined based on the terminal-related information; and
   configuring the terminal to enable data communication via an access point identifiable from the updated access point information.

2. The method of claim 1, wherein receiving updated access point information comprises receiving the updated access point information from a configuration server system.

3. The method of claim 1, wherein receiving updated access point information comprises receiving the updated access point information from a network element associated with providing a service targeted by an application on the terminal.

4. The method of claim 3, wherein transmitting the current access point information from the terminal comprises initiating the transmission of the current access point information via an application on the terminal, and wherein configuring the terminal comprises configuring the terminal to enable data communication with that application via an access point provided via the updated access point information.

5. The method of claim 1, further comprising the terminal retrieving an address of a configuration server upon activation of an application at the terminal, and wherein transmitting the at least current access point information from the terminal comprises transmitting the access point information to the configuration server addressed by the address.

6. The method of claim 5, wherein the terminal retrieving an address comprises the application initiating retrieval of a Uniform Resource Identifier (URI) corresponding to the configuration server.

7. The method of claim 1, further comprising overriding the current access point information with the updated access point information until a subsequent configuration of the access point is performed.

8. The method of claim 1, further comprising temporarily overriding the current access point information with the updated access point information.

9. The method of claim 1, wherein the updated access point information comprises a plurality of access point settings available for use as the access point, and wherein the updated access point information includes a relative prioritization of the plurality of access point settings.

10. The method of claim 9, wherein configuring the terminal comprises configuring the terminal to enable data communications using the highest relative priority access point setting.

11. The method of claim 1, wherein configuring the terminal comprises automatically configuring the terminal to enable data communication via an access point having a network address directly or indirectly obtained via the updated access point information.

12. The method of claim 1, further comprising invoking an application on the terminal, and transmitting the current access point information from the terminal in response to invoking the application on the terminal.

13. The method of claim 1, wherein the updated access point information as configured on the terminal serves as the default access point setting for all applications.

14. The method of claim 13, further comprising obtaining an application-specific access point setting after the default access point has been configured on the terminal, and overriding the default access point setting using the application-specific access point setting.

15. The method of claim 1, wherein receiving updated access point information comprises receiving application-specific access point information that is at least partly dependent on a particular application operating on the terminal.

16. The method of claim 1, wherein receiving updated access point information comprises receiving catalog-specific access point information identifying an access point for communicating with a catalog server system.

17. The method of claim 16, further comprising receiving an address to the catalog server system, and wherein configuring the terminal comprises configuring the terminal to communicate with the catalog server system via the access point identified from the catalog-specific access point setting.

18. The method of claim 1, further comprising disregarding the updated access point information after receipt at the terminal and utilizing the current access point information.

19. The method of claim 1, further comprising storing the updated access point information for subsequent use on the terminal.

20. The method of claim 1, further comprising storing the current access point information, and reverting back to the current access point information from the updated access point information.

21. The method of claim 1, wherein the current access point information comprises a set of one or more available access point settings.

22. A computer-readable storage medium having instructions stored thereon which are executable by an apparatus for performing the method of claim 1.

23. An apparatus comprising:
   storage to store terminal-related information including an identification of at least one current access point by which a terminal can access a network, wherein the terminal-related information is specific to the terminal;
   a transmitter;
   a processing system coupled to the storage and configured to cause the transmitter to direct at least some of the terminal-related information to a network element;
   a receiver configured to receive identification of at least one updated access point from the network element, wherein the updated access point information is specific to the terminal and is determined based on the terminal-related information; and wherein the processing system is further configured to replace at least one of the current access points with the at least one updated access point.

24. The apparatus of claim 23, wherein the processing system is configured to cause one or both of the transmitter and receiver to communicate data with the network element by way of the at least one updated access point.

25. The apparatus of claim 23, wherein:
the storage further stores an address of the network element; and
the processing system is farther configured to retrieve the address of the network element, and to cause the transmitter to direct the at least some terminal-related information to the network element addressed by the address.

26. The apparatus of claim 23, wherein the processing system is configured to cause the transmitter to direct the at least some terminal-related information to the network element in response to activation of an application operable on the terminal.

27. The apparatus of claim 23, wherein the identification of at least one updated access point comprises application-specific access point information, and wherein the processing system is configured to replace at least one of the current access points with an access point identifiable by the application-specific access point information.

28. An apparatus comprising:
a receiver configured to receive terminal-related information from a plurality of terminals, wherein the terminal-related information is specific to the respective terminals and includes at least current access point information by which terminals gain access to a network;
an access point information identification module executable by a processing arrangement and configured to obtain updated access point information for the terminals that is specific to the respective terminals based on at least some of the terminal-specific, terminal-related information; and
a transmitter configured to transmit the updated access point information to the respective terminals for use by the respective terminals in updating the current access point information with the updated access point information.

29. The apparatus of claim 28, wherein the apparatus comprises a database of the updated access point information available for the plurality of terminals, and wherein the access point information identification module is further configured to identify within the database the updated access point information for a particular terminal based on the terminal-related information provided by that particular terminal.

30. The apparatus of claim 28, further comprising a plurality of servers distributed to multiple server locations, wherein at least some of the updated access point information is replicated in databases associated with each of the multiple server locations.

31. A method comprising:
receiving terminal-related information from a terminal, wherein the terminal-related information is specific to the terminal and includes at least current access point information for the terminal;
obtaining updated access point information that is specific to the terminal using at least some of the terminal-specific, terminal-related information, wherein the updated access point information includes at least one updated access point by which the terminal can gain access to a network; and
transmitting the updated access point information to the terminal, thereby facilitating replacement of a current access point with the at least one updated access point at the terminal.

32. A computer-readable storage medium having instructions stored thereon which are executable by an apparatus for performing the method of claim 31.

33. A system comprising:
(a) a configuration server system;
(b) a plurality of terminals, each of the terminals comprising:
storage to store terminal-related information that is specific to the respective terminals and that includes an identification of at least one current access point by which the terminal can access a network;
a transmitter;
a processing system coupled to the storage and configured to cause the transmitter to direct at least some of the terminal-related information to the configuration server system;
a receiver configured to receive identification of at least one updated access point from the configuration server system;
wherein the processing system is further configured to replace at least one of the current access points with the at least one updated access point;
(c) wherein the configuration server system comprises:
a receiver configured to receive the terminal-related information from the terminals;
an access point information identification module executable by a processing arrangement and configured to obtain the identification of the updated access point specific to the respective terminals based on at least some of the terminal-specific, terminal-related information; and
a transmitter configured to transmit the updated access point information to the respective terminals for use by the respective terminals in replacing the at least one current access point with the at least one updated access point.

* * * * *

UNITED STATES PATENT AND TRADEMARK OFFICE
CERTIFICATE OF CORRECTION

| | | |
|---|---|---|
| PATENT NO. | : 7,738,891 B2 | Page 1 of 1 |
| APPLICATION NO. | : 11/478351 | |
| DATED | : June 15, 2010 | |
| INVENTOR(S) | : Jouko U. Tenhunen et al. | |

It is certified that error appears in the above-identified patent and that said Letters Patent is hereby corrected as shown below:

Column 27, Claim 25, line 11: "farther" should be --further--.

Signed and Sealed this

Seventeenth Day of August, 2010

David J. Kappos
*Director of the United States Patent and Trademark Office*